United States Patent
Wang et al.

(10) Patent No.: US 11,724,260 B2
(45) Date of Patent: Aug. 15, 2023

(54) MICROFLUIDIC SENSOR

(71) Applicant: THE REGENTS OF THE UNIVERSITY OF MICHIGAN, Ann Arbor, MI (US)

(72) Inventors: Xuewei Wang, Ann Arbor, MI (US); Mark E Meyerhoff, Ann Arbor, MI (US); Ryan Castle Bailey, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 311 days.

(21) Appl. No.: 16/841,215

(22) Filed: Apr. 6, 2020

(65) Prior Publication Data
US 2020/0316605 A1 Oct. 8, 2020

Related U.S. Application Data

(60) Provisional application No. 62/830,977, filed on Apr. 8, 2019.

(51) Int. Cl.
*B01L 3/00* (2006.01)
*G01N 21/76* (2006.01)
(Continued)

(52) U.S. Cl.
CPC ... *B01L 3/502784* (2013.01); *B01L 3/502715* (2013.01); *G01N 21/33* (2013.01);
(Continued)

(58) Field of Classification Search
CPC ......... B01L 3/502784; B01L 3/502715; B01L 3/5027; B01L 3/502; B01L 3/50;
(Continued)

(56) References Cited

U.S. PATENT DOCUMENTS 6,180,784 B1 1/2001 Wolff et al.
6,183,772 B1 2/2001 Charych et al.
(Continued)

FOREIGN PATENT DOCUMENTS

WO WO2007120241 10/2007
WO WO2007123908 11/2007
(Continued)

OTHER PUBLICATIONS

Han, Measuring rapid kinetics by a potentiometric method in droplet-based microfluidic devices, Chem. Commun., 2012, 48, 1601-1603. (Year: 2012).*
(Continued)

*Primary Examiner* — Christine T Mui
(74) *Attorney, Agent, or Firm* — Casimir Jones S.C.; Thomas A. Isenbarger

(57) ABSTRACT

Provided herein is technology relating to microfluidics and particularly, but not exclusively, to devices, methods, and systems for detecting and/or quantifying analytes in samples using a microfluidic sensor device comprising an oil phase that segments aqueous samples into droplets and provides oil segments that are highly selective chemical sensors for adjacent aqueous droplets.

18 Claims, 12 Drawing Sheets
(9 of 12 Drawing Sheet(s) Filed in Color)

(51) Int. Cl.
  *G01N 21/33* (2006.01)
  *G01N 21/64* (2006.01)
  *G01N 31/22* (2006.01)
(52) U.S. Cl.
  CPC ......... *G01N 21/6428* (2013.01); *G01N 21/76* (2013.01); *G01N 31/22* (2013.01); *B01L 2200/0673* (2013.01); *B01L 2200/16* (2013.01); *B01L 2300/12* (2013.01); *B01L 2300/16* (2013.01); *G01N 2021/6439* (2013.01)
(58) Field of Classification Search
  CPC ......... B01L 2200/0673; B01L 2200/16; B01L 2300/12; B01L 2300/16; G01N 21/76; G01N 21/33; G01N 21/6428; G01N 31/22; G01N 2021/6439
  USPC ........................... 436/86; 422/502, 501, 500
  See application file for complete search history.

(56) References Cited

U.S. PATENT DOCUMENTS

| | | |
|---|---|---|
| 6,306,598 B1 | 10/2001 | Charych et al. |
| 6,565,727 B1 | 5/2003 | Shenderov |
| 6,706,922 B2 | 3/2004 | Wolff et al. |
| 6,740,643 B2 | 5/2004 | Wolff et al. |
| 6,773,566 B2 | 8/2004 | Shenderov |
| 6,911,132 B2 | 6/2005 | Vamsee et al. |

FOREIGN PATENT DOCUMENTS

| | | |
|---|---|---|
| WO | WO2009021173 | 9/2009 |
| WO | WO2017117567 | 7/2017 |

OTHER PUBLICATIONS

Han as evidence by the Electronic Supplementary Information (ESI), HAN, Measuring rapid kinetics by potentiometric method in droplet-based microfluidic devices, The Royal Society of Chemistry, pp. 1-7, 2011. (Year: 2011).*
Wang, Xuewei, et al., Ionophore-Based Biphasic Chemical Sensing in Droplet Microfluidics, Angewandte Chemie International Editionvol. 58, Issue 24 p. 8092-8096. (Year: 2019).*
Guo, Droplet microfluidics for high-throughput biological assays, Lab Chip, 2012, 12, 2146-2155. (Year: 2012).*
Abalde-Cela et al. High-throughput detection of ethanol-producing cyanobacteria in a microdroplet platform. J R Soc Interface. May 6, 2015;12(106):20150216.
Albers et al. Cyclodextrin derivatives in pharmaceutics. Crit Rev Ther Drug Carrier Syst. 1995; 12(4):311-37.
Lindoy, L.F., The Chemistry of Macrocyclic Ligand Complexes; Cambridge University Press, Cambridge, 1989.
Ampurdanes et al. Determination of choline and derivatives with a solid-contact ion-selective electrode based on octaamide cavitand and carbon nanotubes. Biosens Bioelectron. Oct. 15, 2009;25(2):344-9.
Bamsey et al. Development of a potassium-selective optode for hydroponic nutrient solution monitoring. Anal Chim Acta. Aug. 6, 2012;737:72-82.
Basova et al. Droplet microfluidics in (bio)chemical analysis. Analyst. Jan. 7, 2015;140(1):22-38.
Bender, Chapter IV, "Catalyses by Cyclodextrins Leading to Practical Usages of Cyclodextrins" in Cyclodextrin Chemistry (Springer-Verlag, 1978).
Buhlmann et al. Ion-Selective Electrodes With Ionophore-Doped Sensing Membranes. Supramolecular Chemistry: From Molecules to Nanomaterials 5 (2012): 2539.
Ceresa et al. Mechanistic insights into the development of optical chloride sensors based on the [9]mercuracarborand-3 ionophore. Anal Chem. Jan. 1, 2003;75(1):133-40.
Dai et al. Nonseparation Binding/Immunoassays Using Polycation-Sensitive Membrane Electrode Detection. Electroanalysis: An International Journal Devoted to Fundamental and Practical Aspects of Electroanalysis 13.4 (2001): 276-283.
Ding et al. DNA Nanostructure-Based Magnetic Beads for Potentiometric Aptasensing. Anal Chem. Jul. 7, 2015;87(13):6465-9.
Ding et al. Label-free and substrate-free potentiometric aptasensing using polycation-sensitive membrane electrodes. Anal Chem. Feb. 21, 2012;84(4):2055-61.
Doonan et al. K-Channel: A Multifunctional Architecture for Dynamically Reconfigurable Sample Processing in Droplet Microfluidics. Anal Chem. Apr. 4, 2017;89(7):4091-4099.
Dugas, H., Bioorganic Chemistry; Springer-Verlag, New York, 1989.
Eil et al. Ionic immune suppression within the tumour microenvironment limits T cell effector function. Nature. Sep. 22, 2016;537(7621):539-543.
Ferguson et al. Advances in electrochemical and optical polyion sensing: A review. Sensors and Actuators B: Chemical 272 (2018): 643-654.
Friend et al. Fabrication of microfluidic devices using polydimethylsiloxane. Biomicrofluidics. Mar. 15, 2010;4(2):026502.
Guinovart et al. Recognition and Sensing of Creatinine. Angew Chem Int Ed Engl. Feb. 12, 2016;55(7):2435-40.
Guo et al. Droplet microfluidics for high-throughput biological assays. Lab Chip. Jun. 21, 2012;12(12):2146-55.
Hsieh et al. Rapid label-free DNA analysis in picoliter microfluidic droplets using FRET probes. Microfluid Nanofluid 6, 391 (2009).
Huebner et al. Development of quantitative cell-based enzyme assays in microdroplets. Anal Chem. May 15, 2008;80(10):3890-6.
Kalantarifard et al. Label-Free Sensing in Microdroplet-Based Microfluidic Systems. Chemosensors 2018, 6(2), 23.
Kasina et al. Simplified preformed chelate protein radiolabeling with technetium-99m mercaptoacetamidoadipoylglycylglycine (N3S-adipate). Bioconjug Chem. Jan.-Feb. 1998;9(1):108-17.
Kim et al. Optical Probes for Neurobiological Sensing and Imaging. Acc Chem Res. May 15, 2018;51(5):1023-1032.
Koppenhoefer et al. Separation of enantiomers of drugs by capillary electrophoresis. V. Hydroxypropyl-alpha-cyclodextrin as chiral solvating agent. J Chromatogr A. Jan. 9, 1998;793(1):153-64.
Liu et al. Boronic Acid Functionalized Aza-Bodipy (azaBDPBA) based Fluorescence Optodes for the Analysis of Glucose in Whole Blood. ACS Appl Mater Interfaces. Jun. 3, 2015;7(21):11141-5.
Mary et al. Microfluidic droplet-based liquid-liquid extraction. Anal Chem. Apr. 15, 2008;80(8):2680-7.
Mashaghi et al. External control of reactions in microdroplets. Sci Rep. Jul. 2, 2015;5:11837.
Meares et al., "Properties of In Vivo Chelate-Tagged Proteins and Polypeptides" in Modification of Proteins: Food, Nutritional, and Pharmacological Aspects Feeney, R.E., Whitaker, R., Eds., American Chemical Society, Washington, D.C., 1982, pp. 370-387.
Meyerhoff et al. Polyion-sensitive membrane electrodes for biomedical analysis. Analytical Chemistry News & Features. Mar. 1, 1996;68(5):168A-175A.
New, Liposomes: a practical approach (Oxford University Press 1990).
Pitt, Chapter 17, "The Design of Chelating Agents for the Treatment of Iron Overload" in Inorganic Chemistry in Biology and Medicine (Martell, ed., American Chemical Society 1980).
Quake et al. From micro- to nanofabrication with soft materials. Science. Nov. 24, 2000;290(5496):1536-40.
Rosoff, Vesicles (Marcel Dekker, Inc. 1996).
Shang et al. Emerging Droplet Microfluidics. Chem Rev. Jun. 28, 2017;117(12):7964-8040.
Shembekar et al. Single-Cell Droplet Microfluidic Screening for Antibodies Specifically Binding to Target Cells. Cell Rep. Feb. 20, 2018;22(8):2206-2215.

(56) References Cited

OTHER PUBLICATIONS

Sjostrom et al. Multiplex analysis of enzyme kinetics and inhibition by droplet microfluidics using picoinjectors. Lab Chip. May 7, 2013;13(9):1754-61.

Song et al. On-chip titration of an anticoagulant argatroban and determination of the clotting time within whole blood or plasma using a plug-based microfluidic system. Anal Chem. Jul. 15, 2006;78(14):4839-49.

Song et al. Reactions in droplets in microfluidic channels. Angew Chem Int Ed Engl. Nov. 13, 2006;45(44):7336-56.

Song et al. Synthesis of an Amino Acid Analogue to Incorporate p-Aminobenzyl-EDTA in Peptides, Bioconjugate Chem. 1997, 8, 2, 249-252.

Squires et al. Microfluidics: Fluid physics at the nanoliter scale. Reviews of modern physics 77.3 (2005): 977.

Staben et al. Particle transport in Poiseuille flow in narrow channels. International journal of multiphase flow 31.5 (2005): 529-547.

Szejtli, J., Cyclodextrins and Their Inclusion Complexes; Akademiai Klado, Budapest, 1982.

Teh et al. Droplet microfluidics. Lab Chip. Feb. 2008;8(2):198-220.

Tenjarla et al. Preparation, characterization, and evaluation of miconazole-cyclodextrin complexes for improved oral and topical delivery. J Pharm Sci. Apr. 1998;87(4):425-9.

Unger et al. Monolithic microfabricated valves and pumps by multilayer soft lithography. Science. Apr.7, 2000;288(5463):113-6.

Gao et al. Fully integrated wearable sensor arrays for multiplexed in situ perspiration analysis. Nature. Jan. 28, 2016;529(7587):509-514.

Wang et al. A moving-part-free protamine-sensitive polymeric membrane electrode for sensitive biomedical analyses. Biosens Bioelectron. Oct.-Dec. 2012;38(1):145-50.

Wang et al. Microfluidic high-throughput culturing of single cells for selection based on extracellular metabolite production or consumption. Nat Biotechnol. May 2014;32(5):473-8.

Wang et al. Polymeric membrane neutral phenol-sensitive electrodes for potentiometric G-quadruplex/hemin DNAzyme-based biosensing. Anal Chem. Feb. 5, 2013;85(3):1945-50.

Wang et al. Reporter-free potentiometric sensing of boronic acids and their reactions by using quaternary ammonium salt-functionalized polymeric liquid membranes. Anal Chem. Feb. 18, 2014;86(4):1927-31.

Wu, Alan H. B. Tietz clinical guide to laboratory tests (4th ed., Saunders/Elsevier 2006)).

Xie et al. Ion selective optodes: from the bulk to the nanoscale. Anal Bioanal Chem. May 2015;407(14):3899-910.

Ye et al. Absorbance characterization of microsphere-based ion-selective optodes. Anal Chim Acta. Jul. 23, 2007;596(2):195-200.

Zhai et al. Boronic acid functionalized boron dipyrromethene fluorescent probes: preparation, characterization, and saccharides sensing applications. Anal Chem. Dec. 4, 2012;84(23):10214-20.

Zhu et al. Analytical detection techniques for droplet microfluidics—a review. Anal Chim Acta. Jul. 17, 2013;787:24-35.

Zughul et al. Thermodynamics of propylparaben/beta-cyclodextrin inclusion complexes. Pharm Dev Technol. Feb. 1998;3(1):43-53.

\* cited by examiner

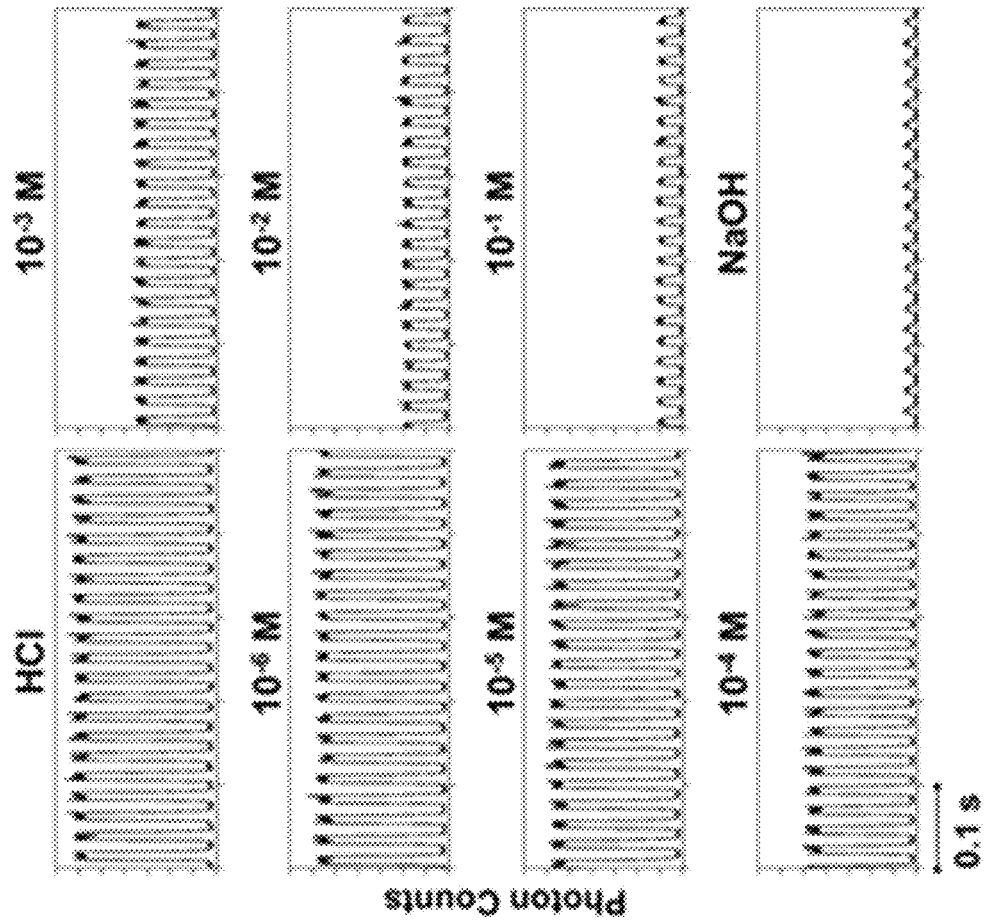
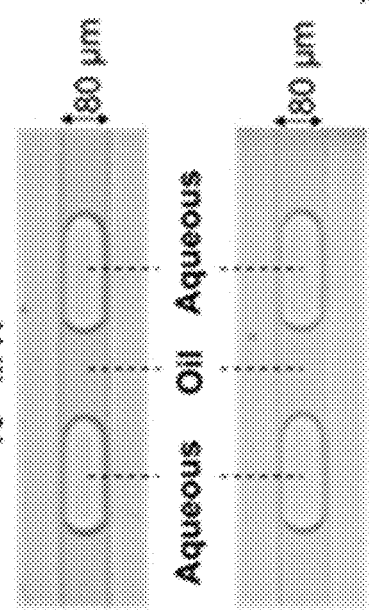
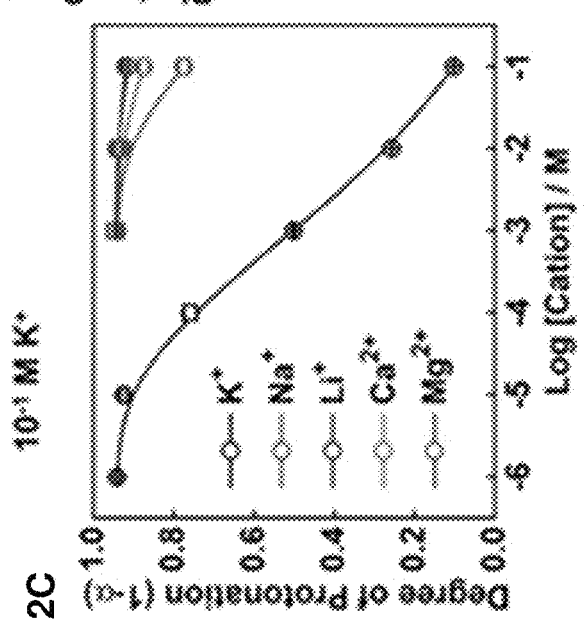
FIG. 2A
FIG. 2B
FIG. 2C

Sensing reagents:

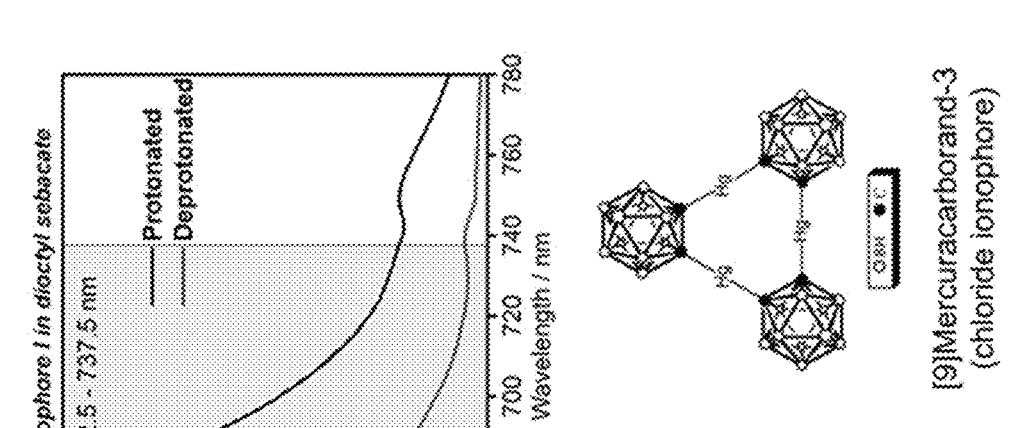
FIG. 8A
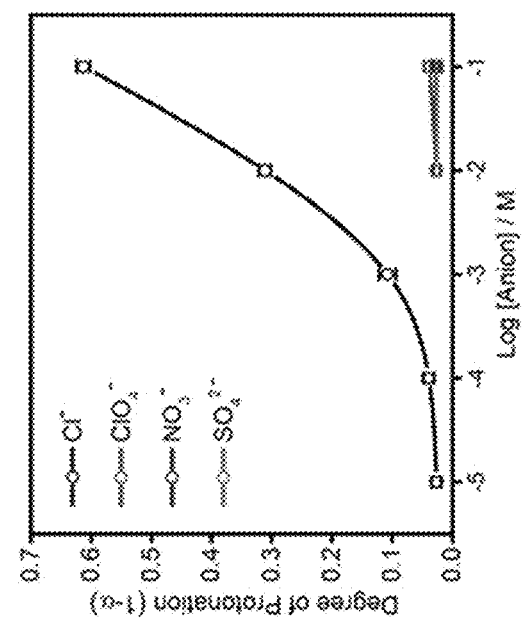
FIG. 8B
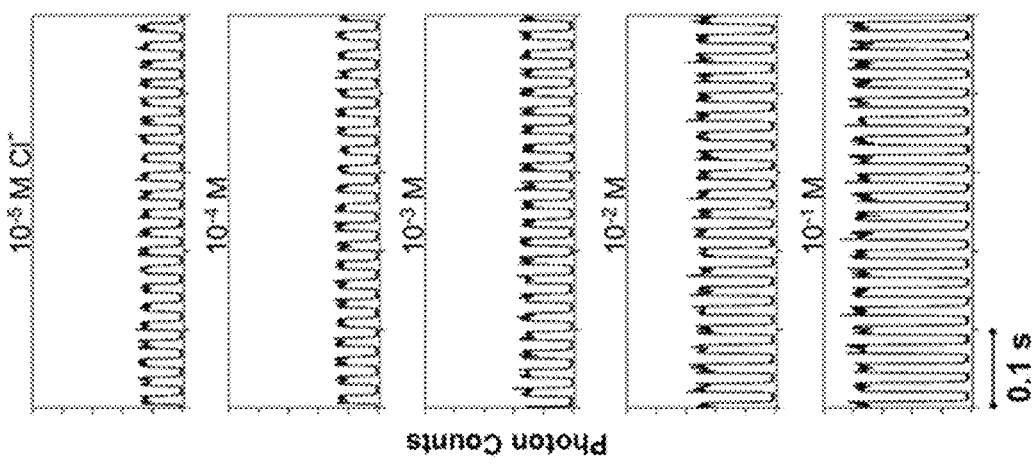
FIG. 8C
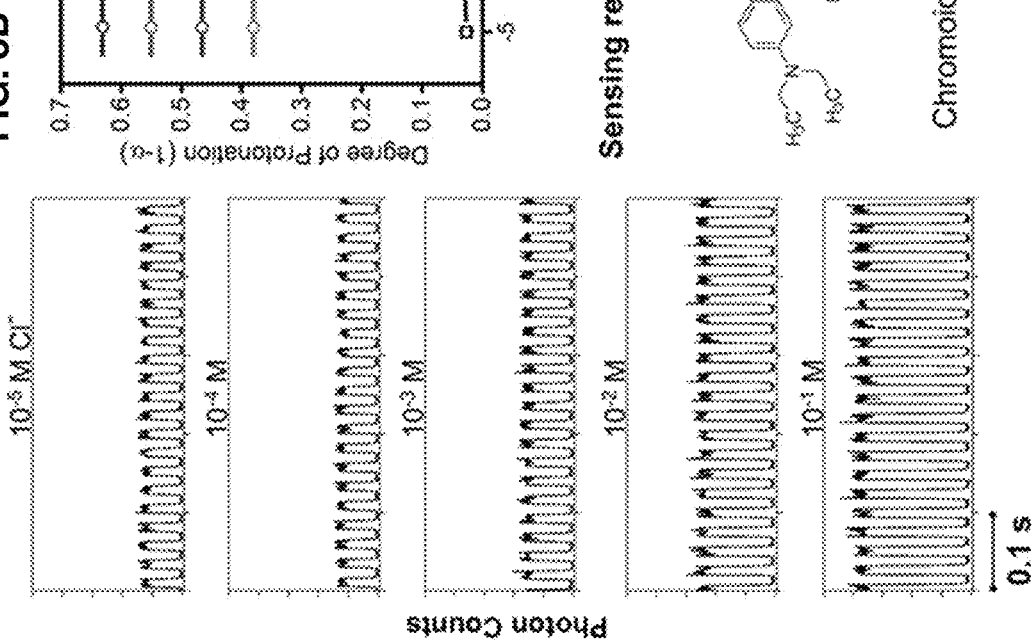

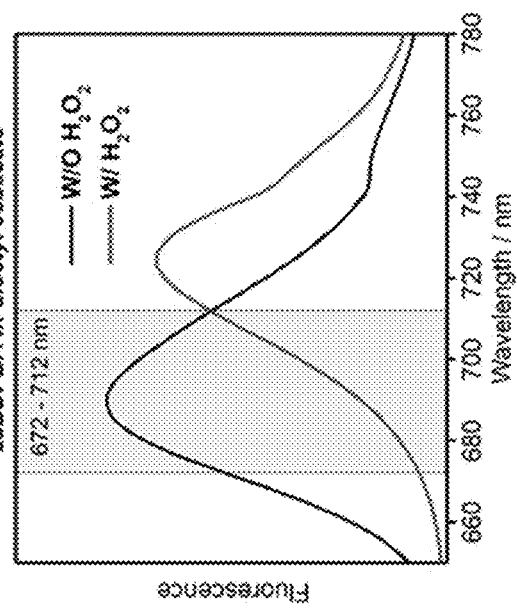
FIG. 10A
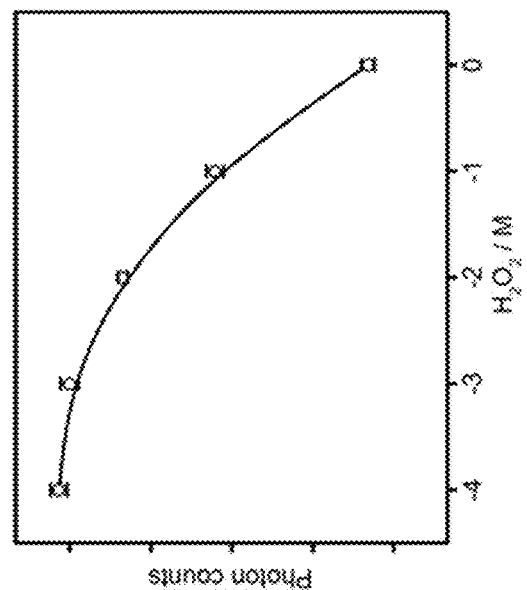
FIG. 10B
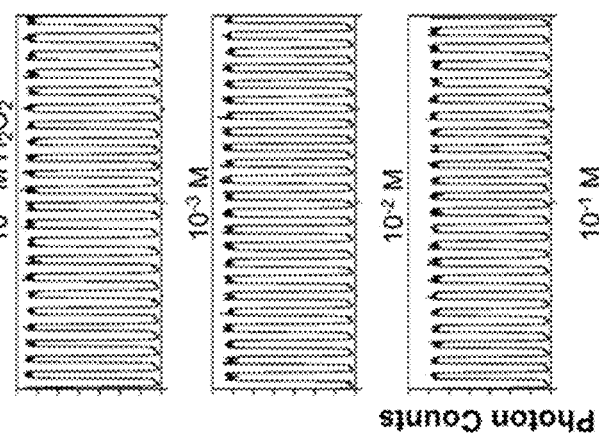
FIG. 10C
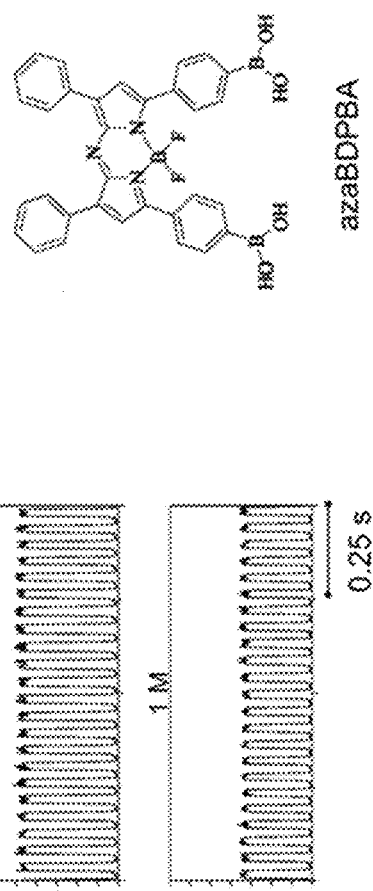
Sensing reagents:
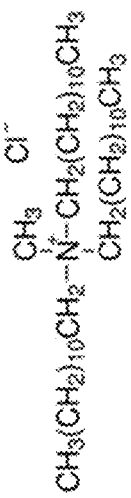

MICROFLUIDIC SENSOR

This application claims priority to U.S. provisional patent application Ser. No. 62/830,977, filed Apr. 8, 2019, which is incorporated herein by reference in its entirety.

STATEMENT REGARDING FEDERALLY SPONSORED RESEARCH OR DEVELOPMENT

This invention was made with government support under CA191186 awarded by the National Institutes of Health. The government has certain rights in the invention.

FIELD

Provided herein is technology relating to microfluidics and particularly, but not exclusively, to devices, methods, and systems for detecting and/or quantifying analytes in samples using a microfluidic sensor device.

BACKGROUND

Over the past two decades, droplet microfluidics has emerged as a subcategory of microfluidics that has found numerous applications in drug screening, directed evolution, single-cell analysis, and clinical diagnostics, as well as for synthesis of materials and molecules (S. Y. Teh, R. Lin, L. H. Hung, A. P. Lee, Lab. Chip. 2008, 8, 198-220; M. T. Guo, A. Rotem, J. A. Heyman, D. A. Weitz, Lab. Chip. 2012, 12, 2146-2155; L. R. Shang, Y. Cheng, Y. J. Zhao, Chem. Rev. 2017, 117, 7964-8040, each of which is incorporated herein by reference). In pressure-driven droplet microfluidics, an aqueous flow and a water-immiscible oil flow intersect via a microchannel junction, such as a T-junction or a flow-focusing geometry. Discrete and monodisperse aqueous droplets or plugs are generated at femtoliter to nanoliter volumes and at a frequency ranging from Hz to kHz. This technique offers opportunities such as screening drug candidates and enzyme mutants in a reagent-conservative and high-throughput fashion; detecting and/or quantifying biomarkers; chemical testing in small volumes of body fluids for minimally invasive diagnostics; and studying individual cells, bacteria, and/or viruses with low dilution factors and negligible liquid evaporation. The effective internal circulation within the flowing liquid segments and the favored interfacial mass transfer between microscale volumes also make droplet microfluidics an efficient scaffold for chemical synthesis and liquid-liquid extraction (S. Y. Teh, R. Lin, L. H. Hung, A. P. Lee, Lab. Chip. 2008, 8, 198-220; P. Mary, V. Studer, P. Tabeling, Anal. Chem. 2008, 80, 2680-2687; S. Mashaghi, A. M. Van Oijen, Sci. Rep. 2015, 5, 11837, each of which is incorporated herein by reference), studying and monitoring enzyme reactions and/or chemical interactions, and examining biochemical activities of cells and/or bacteria.

A wide variety of detection modalities have been employed in droplet microfluidics, e.g., fluorescence spectroscopy, bright-field microscopy, infrared spectroscopy, surface-enhanced Raman spectroscopy, mass spectrometry, nuclear magnetic resonance spectroscopy, and electrochemistry (Y. Zhu, Q. Fang, Anal. Chim. Acta 2013, 787, 24-35; E. Y. Basova, F. Foret, Analyst 2015, 140 22-38; A. Kalantarifard, A. Saateh, C. Elbuken, Chemosensors 2018, 6, 23, incorporated herein by reference). Among them, fluorescence-based techniques are prevalent because their fast measurement rates readily match the high droplet generation frequencies of droplet microfluidic technologies and their high sensitivities are suited for the very low volumes of samples confined in microchannels. However, current fluorescent tests are primarily restricted to specifically designed enzyme assays (e.g., alkaline phosphatase (A. Huebner, L. F. Olguin, D. Bratton, G. Whyte, W. T. S. Huck, A. J. De Mello, J. B. Edel, C. Abell, F. Hollfelder, Anal. Chem. 2008, 80, 3890-3896, incorporated herein by reference) and beta-galactosidase (S. L. Sjostrom, H. N. Joensson, H. A. Svahn, Lab. Chip. 2013, 13, 1754-1761, incorporated herein by reference)) using fluorogenic substrates, metabolite detection (e.g., L-lactate (B. L. Wang, A. Ghaderi, H. Zhou, J. Agresti, D. A. Weitz, G. R. Fink, G. Stephanopoulos, Nat. Biotechnol. 2014, 32, 473-478, incorporated herein by reference) and ethanol (S. Abalde-Cela, A. Gould, X. Liu, E. Kazamia, A. G. Smith, C. Abell, J. R. Soc. Interface. 2015, 12, 20150216, incorporated herein by reference)) using coupled enzyme reactions, and bioaffinity assays (e.g., immunoassay (N. Shembekar, H. Hu, D. Eustace, C. A. Merten, Cell reports 2018, 22, 2206-2215, incorporated herein by reference) and DNA hybridization assays (A. T. H. Hsieh, P. J. H. Pan, A. P. Lee, Microfluidics and Nanofluidics, 2009, 6, 391-401, incorporated herein by reference)) using fluorophore-labelled biomacromolecules. Accordingly, additional technologies are needed.

SUMMARY

For instance, the use of molecular probes based on supramolecular host-guest recognition is rare in droplet microfluidics due to the lack of probes (e.g., recognition molecules) that function satisfactorily in an aqueous phase. In particular, the droplet microfluidic technology provided herein provides an oil phase comprising sensing molecules (e.g., a signaling molecule; or a signaling molecule and a recognition molecule; and, optionally, an exchanger molecule (e.g., an ion exchanger molecule)). The oil phase is used to segment aqueous samples into droplets as in previous microfluidic technologies. However, in contrast to previous technologies, the present technology uses an oil phase that both segments samples (e.g., biological samples, environmental samples) into droplets and provides oil segments (e.g., in the sub-nanoliter or nanoliter range) that are highly selective chemical sensors for adjacent aqueous droplets. The technology provides several advantages over previous technologies. In particular, the oil-based sensing scheme described herein does not require aqueous solubility of sensing molecules such as, e.g., fluorescent probes. Further, the technology provided herein facilitates certain supramolecular recognitions by suppressing hydration of both host and guest molecules and does not suffer from optical interference from the color and/or turbidity of aqueous samples. The technology provided herein simplifies the operation of microfluidic devices by eliminating the use of an extra aqueous stream to introduce molecular probes into the stream of sample.

In some embodiments, the technology provides an electrolyte sensor. For example, embodiments of the technology provide sensors for ions such as, e.g., $K^+$, $Na^+$, $Cl^-$, etc. Some previous technologies for electrolyte analysis have used ionophore-based ion-selective sensors (e.g., electrodes and optodes) (P. Buhlmann; L. D. Chen, in Supramolecular Chemistry: From Molecules to Nanomaterials (Eds.: J. W. Steed, P. Gale), John Wiley & Sons, Ltd, New York, 2012, 2539-2579; X. Xie, E. Bakker, Anal. Bioanal. Chem. 2015, 407, 3899-3910; E. H. Kim, G. Chin, G. Rong, K. E. Poskanzer, H. A. Clark, Acc. Chem. Res. 2018, 51, 1023-1032; W. Gao, S. Emaminejad, H. Y. Y. Nyein, S. Challa, K.

Chen, A. Peck, H. M. Fahad, H. Ota, H. Shiraki, D. Kiriya, D. H. Lien, Nature, 2016, 529, 509-514, each of which is incorporated herein by reference). While these previous sensors have used a water-immiscible organic phase (e.g., a plasticizer-based membrane or micro-particle) to assay aqueous samples, these previous technologies for macro-scale ionophore-based sensors have not been successfully modified for or incorporated into a microfluidic platform. Accordingly, the electrolyte sensing technology described herein provides an important improvement in microfluidic based biological assays and clinical chemistry technologies because in-situ sensing of these ions has not been achieved in droplet microfluidics despite the importance of electrolyte assays for disease diagnostics, ion channel studies, and understanding immune suppression mechanisms (R. Eil, S. K. Vodnala, D. Clever, C. A. Klebanoff, M. Sukumar, J. H. Pan, D. C. Palmer A. Gros, T. N. Yamamoto, S. J. Patel, G. C. Guittard, Z. Y. Yu, V. Carbonaro, K. Okkenhaug, D. S. Schrump, W. M. Linehan, R. Roychoudhuri, N. P. Restifo, Nature 2016, 537, 539-543, incorporated herein by reference). However, as disclosed herein, the technology is not limited to sensing electrolytes (e.g., comprising one or more charges). In some embodiments, the technology provides a sensor for uncharged analytes, polar analytes, etc.

Accordingly, in some embodiments the technology provides a microfluidic analyte sensor. In some embodiments, the microfluidic analyte sensor comprises a sensing oil, wherein said sensing oil is capable of forming droplets from a biological sample and producing a detectable signal in response to contacting an analyte. In some embodiments, the sensing oil comprises a signaling molecule that is specific for the analyte and that produces the detectable signal. In some embodiments, the sensing oil comprises a recognition molecule that is specific for the analyte and a signaling molecule that is capable of producing a detectable signal. In some embodiments, the sensing oil further comprises an exchanger molecule.

The technology is not limited in the oil that is used to provide the sensing oil provided that it is capable of dissolving signaling molecules and/or recognition molecules (and, optionally, exchanger molecules) and is capable of forming droplets from a sample (e.g., a biological sample, an environmental sample). In exemplary embodiments, the sensing oil comprises an oil that is, e.g., dioctyl sebacate, mineral oil, hexadecane, 4-3-phenylpropylpyridine, dichloroethane, or a fluorous oil.

In some embodiments, the sensing oil comprises a chromoionophore. In some embodiments, the sensing oil comprises a pH-sensitive dye. In some embodiments, the sensing oil comprises a chromoionophore and an ionophore. In some embodiments, the sensing oil further comprises an exchanger molecule.

The technology is not limited in the samples that can be analyzed by the microfluidic devices provided herein. In some embodiments, the microfluidic device analyzes a biological or environmental sample. In some embodiments, the biological sample is a biofluid. In some embodiments, the biological sample is blood.

Embodiments of the technology relate to a microfluidic analyte sensing device that comprises a sensing oil that is capable of producing droplets from a sample and detecting an analyte by contacting said droplets. In some embodiments, the microfluidic analyte sensing device is capable of producing and/or produces droplets having a volume of 0.05 to 50 nl (e.g., 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.00, 2.00, 3.00, 4.00, 5.00, 6.00, 7.00, 8.00, 9.00, 10.00, 11.00, 12.00, 13.00, 14.00, 15.00, 16.00, 17.00, 18.00, 19.00, 20.00, 21.00, 22.00, 23.00, 24.00, 25.00, 26.00, 27.00, 28.00, 29.00, 30.00, 31.00, 32.00, 33.00, 34.00, 35.00, 36.00, 37.00, 38.00, 39.00, 40.00, 41.00, 42.00, 43.00, 44.00, 45.00, 46.00, 47.00, 48.00, 49.00, or 50.00 nl).
In some embodiments, the microfluidic analyte sensing device is capable of producing and/or produces sensing oil segments having a volume of 0.05 to 50 nl (e.g., 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.00, 2.00, 3.00, 4.00, 5.00, 6.00, 7.00, 8.00, 9.00, 10.00, 11.00, 12.00, 13.00, 14.00, 15.00, 16.00, 17.00, 18.00, 19.00, 20.00, 21.00, 22.00, 23.00, 24.00, 25.00, 26.00, 27.00, 28.00, 29.00, 30.00, 31.00, 32.00, 33.00, 34.00, 35.00, 36.00, 37.00, 38.00, 39.00, 40.00, 41.00, 42.00, 43.00, 44.00, 45.00, 46.00, 47.00, 48.00, 49.00, or 50.00 nl). In some embodiments, the microfluidic analyte sensing device is capable of producing and/or produces sensing oil segments at a frequency of 10 to 1000 Hz (e.g., 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 Hz). In some embodiments, the microfluidic analyte sensing device is capable of producing and/or produces droplets at a frequency of 10 to 1000 Hz (e.g., 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 Hz). In some embodiments, the microfluidic analyte sensing device is capable of detecting and/or detects an analyte having a concentration of 1 to $10^{-12}$ M (e.g., 1, $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, $10^{-12}$ M) and/or 0.1 to 500 µg/ml (e.g., 0.1, 0.2, 0.3, 0.4, 0.5, 0.6, 0.7, 0.8, 0.9, 1.0, 1.0, 2.0, 3.0, 4.0, 5.0, 6.0, 7.0, 8.0, 9.0, 10.0, 10.0, 20.0, 30.0, 40.0, 50.0, 60.0, 70.0, 80.0, 90.0, 100.0, 110.0, 120.0, 130.0, 140.0, 150.0, 160.0, 170.0, 180.0, 190.0, 200.0, 210.0, 220.0, 230.0, 240.0, 250.0, 260.0, 270.0, 280.0, 290.0, 300.0, 310.0, 320.0, 330.0, 340.0, 350.0, 360.0, 370.0, 380.0, 390.0, 400.0, 410.0, 420.0, 430.0, 440.0, 450.0, 460.0, 470.0, 480.0, 490.0, or 500.0 µg/ml) in a sample or droplet.

In some embodiments, the technology provides a sensing oil. In some embodiments, the sensing oil comprises a signaling molecule that is specific for the analyte and that produces the detectable signal. In some embodiments, the sensing oil comprises a recognition molecule that is specific for the analyte and a signaling molecule that is capable of producing a detectable signal. In some embodiments, the sensing oil further comprises an exchanger molecule (e.g., an ion exchanger molecule). In some embodiments, the sensing oil is provided in a segment having a volume of 0.05 to 50 nl (e.g., 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.00, 2.00, 3.00, 4.00, 5.00, 6.00, 7.00, 8.00, 9.00, 10.00, 11.00, 12.00, 13.00, 14.00, 15.00, 16.00, 17.00, 18.00, 19.00, 20.00, 21.00, 22.00, 23.00, 24.00, 25.00, 26.00, 27.00, 28.00, 29.00, 30.00, 31.00, 32.00, 33.00, 34.00, 35.00, 36.00, 37.00, 38.00, 39.00, 40.00, 41.00, 42.00, 43.00, 44.00, 45.00, 46.00, 47.00, 48.00, 49.00, or 50.00 nl). In some embodiments, the sensing oil is in contact with a droplet having a volume of 0.05 to 50 nl (e.g., 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.00, 2.00, 3.00, 4.00, 5.00, 6.00, 7.00, 8.00, 9.00, 10.00, 11.00, 12.00, 13.00, 14.00, 15.00, 16.00, 17.00, 18.00, 19.00, 20.00, 21.00, 22.00, 23.00, 24.00, 25.00, 26.00, 27.00, 28.00, 29.00, 30.00, 31.00, 32.00, 33.00, 34.00, 35.00, 36.00, 37.00, 38.00, 39.00, 40.00, 41.00, 42.00, 43.00, 44.00, 45.00, 46.00, 47.00, 48.00, 49.00, or 50.00 nl), e.g., a droplet comprising an analyte (e.g., a droplet that comprises or is produced from a biological sample (e.g., a droplet that comprises or is produced from a biofluid (e.g., a droplet that comprises or is produced from blood))).

The technology is not limited in the oil that is used to provide the sensing oil provided that it is capable of dissolving signaling molecules and/or recognition molecules (and, optionally, exchanger molecules) and is capable of forming droplets from a sample (e.g., a biological sample, an environmental sample). In exemplary embodiments, the sensing oil comprises an oil that is, e.g., dioctyl sebacate, mineral oil, hexadecane, 4-3-phenylpropylpyridine, dichloroethane, or a fluorous oil.

In some embodiments, the sensing oil comprises a chromoionophore. In some embodiments, the sensing oil comprises a pH-sensitive dye. In some embodiments, the sensing oil comprises a chromoionophore and an ionophore. In some embodiments, the sensing oil further comprises an exchanger molecule (e.g., an ion exchanger molecule).

Some embodiments relate to kits. In some embodiments, a kit comprises a microfluidic analyte sensor as described herein. In some embodiments, a kit comprises a sensing oil as described herein. In some embodiments, a kit comprises microfluidic analyte sensor as described herein and a component for obtaining a biological sample (e.g., a syringe, lancet, swab, collection cup, etc.). In some embodiments, kits comprise a microfluidic device, a sensing oil as described herein, and a component for obtaining a biological sample (e.g., a syringe, lancet, swab, collection cup, etc.).

Some embodiments relate to systems. In some embodiments, systems comprise a microfluidic analyte sensor as described herein. In some embodiments, systems further comprise a detection means. In some embodiments, systems further comprise a computer. In some embodiments, systems further comprise a pump. In some embodiments, systems further comprise a source of a sensing oil (e.g., an input stream, a reservoir, a tank, etc.). In some embodiments, systems further comprise a component for sample input. In some embodiments, systems further comprise a component for presenting data characterizing the presence, absence, amount, and/or concentration of an analyte.

Some embodiments relate to methods for detecting and/or quantifying an analyte. For example, in some embodiments, methods comprise providing a microfluidic analyte sensor comprising a sensing oil; forming droplets from a biological sample and sensing oil segments from said sensing oil; and detecting and/or quantifying an analyte in one or more of said droplets. In some embodiments, methods further comprise producing said sensing oil by dissolving a signaling molecule in an oil to produce said sensing oil; and/or dissolving a signaling molecule and a recognition molecule in an oil to produce said sensing oil. In some embodiments, methods further comprise producing said sensing oil by dissolving an exchanger molecule in said oil to produce said sensing oil.

In some embodiments, detecting and/or quantifying an analyte in one or more of said droplets comprises producing a detectable signal in response to contacting an analyte with said sensing oil. In some embodiments, detecting and/or quantifying an analyte in one or more of said droplets comprises detecting a detectable signal produced in response to contacting an analyte with said sensing oil. In some embodiments, detecting and/or quantifying an analyte in one or more of said droplets comprises detecting a change in the color, UV-visible absorbance, fluorescence, and/or luminescence. In some embodiments, methods further comprise the volume of one or more droplets and/or segments of sensing oil.

The technology finds use in a wide range of applications, e.g., in the clinical, industrial, and research settings. Accordingly, the technology provides use of a microfluidic analyte sensor as described herein to detect and/or quantify an analyte in a biological or environmental sample. In some embodiments, the technology provides use of a microfluidic analyte sensor of as described herein to identify an analyte that binds to a biological molecule.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings. The patent or application file contains at least one drawing executed in color. Copies of this patent or patent application publication with color drawings will be provided by the Office upon request and payment of the necessary fee.

FIG. 2A shows bright-field images of segmented fluids in the presence of 10$^{-6}$ M and 10$^{-1}$ M KCl in the aqueous phase.

FIG. 2B shows fluorescence traces of the segmented flow in the presence of different concentrations of KCl in Tris-HCl buffer at pH 7.4 and 0.1 M HCl or NaOH.

FIG. 2C shows the response curve of the K$^+$-specific sensing method shown in FIGS. 1, 2A, and 2B toward different cations using a 0.5-s measurement (n=3). The trace for K$^+$ is in the central portion of the plot and the traces for the other analytes are bunched together in the top right of the plot.

FIG. 8A shows fluorescence traces of the segmented flow at different concentrations of NaCl in 0.1 M HEPES buffer at pH 7.4. An emission wavelength band of 672.5 nm to 737.5 nm and an excitation wavelength of 630 nm were employed.

FIG. 8B shows the calibration curve corresponding to the data collected in FIG. 8A. The curve was based on the degree of protonation of the chromoionophore, which was calculated from the mean photon counts of the oil segments in the 0.5-s measurement shown in FIG. 8A.

FIG. 8C shows the fluorescence spectra of the fully protonated and deprotonated chromoionophore dissolved in the bulk dioctyl sebacate. The response principle was previously reported in plasticized polymer membrane-based sensors (see, e.g., A. Ceresa, Y. Qin, S. Peper, E. Bakker. Anal. Chem. 2003, 75, 133-140, incorporated herein by reference).

FIG. 10A shows fluorescence traces of the segmented flow at different concentrations of $H_2O_2$ in 50 mM phosphate buffer at pH 7.4. An emission wavelength band of 672 mm to 712 nm and an excitation wavelength of 640 nm were employed.

FIG. 10B shows a calibration curve corresponding to the mean photon counts of the oil segments in the 1-s test as shown in FIG. 10A.

FIG. 10C shows fluorescence spectra of the dioctyl sebacate bulk solution comprising azaBDPBA and TDMACl before and after reaction with 1 M $H_2O_2$ in the aqueous solution, which corresponds to the original boronic acids reactants and the phenolic products. Thorough mixing of the oil solution and the aqueous buffer with and without $H_2O_2$ was performed for 5 minutes before phase separation via centrifugation. Then, the oil phase was transferred to a cuvette for fluorescence measurement. Notably, the lipophilic anion exchanger, TDMACl was used according to previously reported sensors (see, e.g., Y. Liu, J. Zhu, Y. Xu, Y. Qin, D. Jiang, ACS Appl. Mater. Interfaces 2015, 7, 11141-11145, incorporated herein by reference).

Figure 1:
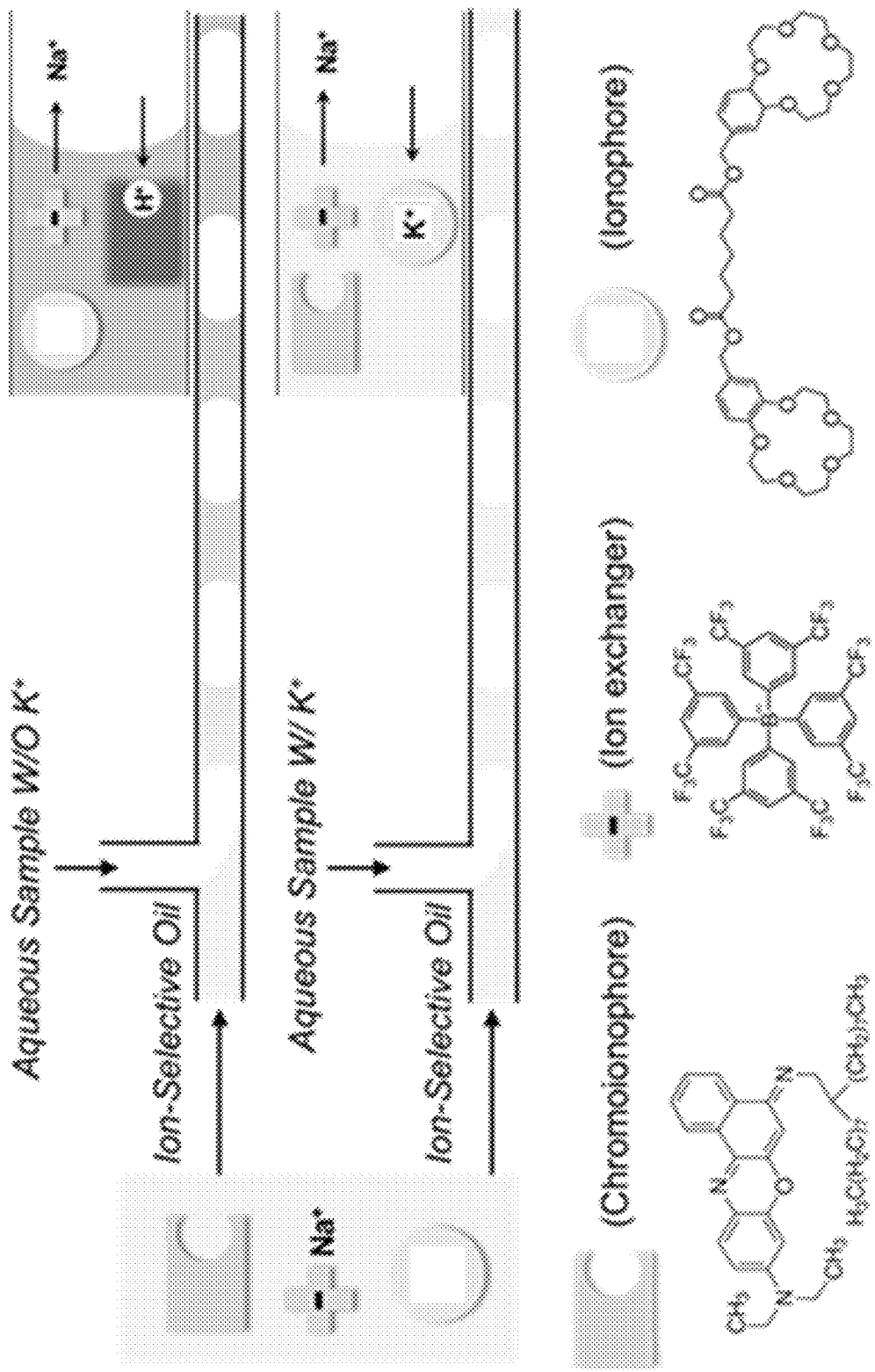
FIG. 1 is a schematic drawing showing the response principle of the embodiments of the sensing technology provided herein. The drawing shows an exemplary embodiment of the technology for detecting K$^+$ using biphasic sensing in droplet microfluidics.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers are used throughout the drawings to refer to the same or like parts. Moreover, it should be appreciated that the drawings are not intended to limit the scope of the present teachings in any way.

DETAILED DESCRIPTION

Provided herein is technology relating to microfluidics and particularly, but not exclusively, to devices, methods, and systems for detecting and/or quantifying analytes in samples using a microfluidic sensor device.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, the terms "subject" and "patient" refer to any organisms including plants, microorganisms, and animals (e.g., mammals such as dogs, cats, livestock, and humans).

As used herein, the term "analyte" refers to a substance to be tested, assayed, detected, imaged, characterized, and/or quantified. Exemplary analytes include, but are not limited to, electrolytes (e.g., ions (e.g., cations, anions), polyanions), biomolecules (e.g., nucleic acids (e.g., DNA, RNA, methylated and other modified nucleobases), polypeptides (e.g., peptides, proteins, glycoproteins), carbohydrates, lipids, post-translational modifications, amino acids, and metabolites), small molecules (drugs, bioactive agents, toxins), etc.

As used herein, the term "microfluidic device" refers to a device comprising fluidic structures and internal channels having microfluidic dimensions. These fluidic structures may include chambers, valves, vents, vias, pumps, inlets, nipples, and detection means, for example. Generally, microfluidic channels are fluid passages having at least one internal cross-sectional dimension that is less than approximately 500 μm to 1000 μm and typically between approximately 0.1 μm and approximately 500 μm. The microfluidic flow regime is characterized by "Poiseuille" or "laminar" flow (see, e.g., Staben et al. (2005) "Particle transport in Poiseuille flow in narrow channels" Intl J Multiphase Flow 31: 529-47, incorporated herein by reference).

As used herein, the term "microfluidic channel" or "microchannel" refers to a fluid channel having variable length and one dimension in cross-section that is less than 10 to 1000 μm. Microfluidic fluid flow behavior in a microfluidic channel is highly non-ideal and laminar and may be more dependent on wall wetting properties, roughness, liquid viscosity, adhesion, and cohesion than on pressure drop from end to end or cross-sectional area. The microfluidic flow regime is often associated with the presence of "virtual liquid walls" in the channel. However, in larger channels, head pressures of 10 psi or more can generate transitional flow regimes bordering on turbulent flow, as can be important in rinse steps of assays.

As used herein, the term "via" refers to a step in a microfluidic channel that provides a fluid pathway from one substrate layer to another substrate layer above or below, characteristic of laminated devices built from layers.

As used herein, the term "waste" refers to a discharged sample, a rinse solution, waste reagents, etc., e.g., comprising non-analyte components.

As used herein a "vent" refers to a pore intercommunicating between an internal cavity and the atmosphere. In some embodiments, a vent comprises a filter element that is permeable to gas but is hydrophobic and resists wetting. Optionally these filter elements have pore diameters of 0.45 micrometers or less. Filter elements of this type and construction may also be placed internally, for example to isolate a valve or bellows pump from the pneumatic manifold controlling it.

As used herein, the term "means for a function" indicates that the scope of the technology encompasses all means for performing the function that are described herein and all other means commonly known in the art at the time of filing.

As used herein, the term "means for detecting" or "detection means" refers to an apparatus for monitoring a signal and/or displaying signal value, e.g., to monitor the progress of an assay and/or to determine a result of an assay. A detection means may include a detection channel and a means for evaluation of a signal value. A signal may be detected and/or evaluated by an observer visually or by a machine equipped with a detection means such as a spectrophotometer, fluorometer, luminometer, photomultiplier tube, photodiode, nephlometer, photon counter, voltmeter, ammeter, pH meter, capacitative sensor, radio-frequency transmitter, magnetoresistometer, or Hall-effect device.

Magnifying lenses, optical filters, colored fluids, and labeling may be used to improve detection and interpretation of a signal. Means for detection may also include the use of "labels" or "tags" such as, but not limited to, dyes such as chromophores and fluorophores, radio frequency tags, plasmon resonance, spintronic, radiolabel, Raman scattering, chemoluminescence, or inductive moment as are known in the art. Fluorescence quenching signals are also included. A variety of substrate and product chromophores associated with biochemical enzyme assays are also well known in the art and, in some embodiments, provide a means for amplifying a signal so as to improve sensitivity of detection. In some embodiments, detection comprises use of a radionuclide detection system. Detection means or systems are optionally qualitative, quantitative, or semi-quantitative. Visual detection is preferred for its simplicity; however, detection means can involve visual detection, machine detection, manual detection, or automated detection.

As used herein, the term "detectable signal" includes detecting changes in fluorescence, changes in luminescence, changes in absorbance, changes in transmission, and changes in color.

As used herein, the term "spectrum" refers to the distribution of light energies arranged in order of wavelength.

As used the term "visible spectrum" or "color" refers to light radiation that contains wavelengths from approximately 360 nm to approximately 800 nm.

As used herein, the term "droplet" refers to a volume of liquid that is at least partially bounded by another fluid (e.g., an oil). One or more droplets in a microfluidic device may be referred to as the "droplet phase". In some embodiments, the droplet phase is and aqueous phase. In embodiments of the technology provided herein, the droplets are produced from an aqueous sample (e.g., to produce an aqueous droplet phase) and the droplets are bounded by an oil. In some embodiments, a droplet is completely surrounded by oil or, in some embodiments, is bounded by oil and one or more surfaces of a microfluidic device or non-microfluidic device that produces and/or processes droplets. While embodiments of the technology described in the examples comprise aqueous droplets, droplets may, for example, be aqueous or non-aqueous or may be mixtures or emulsions including aqueous and non-aqueous components. Droplets may take a wide variety of shapes; nonlimiting examples include generally disc shaped, slug shaped, truncated sphere, ellipsoid, spherical, partially compressed sphere, hemispherical, ovoid, cylindrical, and various shapes formed during droplet operations, such as merging or splitting or formed as a result of contact of such shapes with one or more surfaces of a device for manipulating droplets. For examples of droplets and devices for forming and/or manipulating droplets, see U.S. Pat. No. 6,911,132; U.S. patent application Ser. No. 11/343,284; U.S. Pat. Nos. 6,773,566 and 6,565,727; International Patent Application No. PCT/US2006/047486, International Patent Application No. PCT/US2016/069579, each of which is incorporated herein by reference. In some embodiments, droplets are manipulated using droplet actuator systems, e.g., as described in International Patent Application No. PCT/US2007/009379.

As used herein, the term "droplet operation" refers to any manipulation of a droplet. A droplet operation may, for example, include: forming a droplet; loading a droplet into a microfluidic device; dispensing one or more droplets from a source of droplets; splitting, separating, or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; heating a droplet; vaporizing a droplet; condensing a droplet from a vapor; cooling a droplet; disposing of a droplet; transporting a droplet out of a microfluidic device; other droplet operations described herein; and/or any combination of the foregoing. The terms "merge", "merging", "combine", "combining" and the like are used to describe the creation of one droplet from two or more droplets. It should be understood that when such a term is used in reference to two or more droplets, any combination of droplet operations sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other. The terms "splitting," "separating" and "dividing" are not intended to imply any particular outcome with respect to size of the resulting droplets (e.g., the size of the resulting droplets can be the same or different) or number of resulting droplets (the number of resulting droplets may be 2, 3, 4, 5 or more). The term "mixing" refers to droplet operations which result in more homogenous distribution of one or more components within a droplet. Examples of "loading" droplet operations include microdialysis loading, pressure assisted loading, robotic loading, passive loading, and pipette loading. In various embodiments, the droplet operations may be electrode mediated, e.g., electrowetting mediated or dielectrophoresis mediated.

As used herein, the term "oil" or "oil phase" is used to refer to a fluid that is sufficiently immiscible with the droplet phase. The oil may, for example, be a low-viscosity oil, such as silicone oil. In some embodiments, the oil is capable of dissolving sensing chemicals (e.g., chromoionophores, ionophores, and ion exchangers as described herein) to produce a "sensing oil" and the formed sensing oil is capable of forming droplets from aqueous samples (e.g., biological samples; environmental samples). Accordingly, as used herein, the term "sensing oil" refers to an oil comprising sensing components (e.g., dissolved sensing components). In some embodiments, a "sensing oil" comprises a chromoionophore, an ionophore, and an ion exchanger as described herein. Other examples of oils are provided in International Patent Application No. PCT/US2006/047486 and in International Patent Application No. PCT/US2008/072604, each of which is incorporated herein by reference. In particular embodiments, the oil used in the technology provided herein does not comprise a surfactant. That is, in some embodiments, the technology comprises a "surfactant-free" oil and/or a "surfactant-free" sensing oil (e.g., a surfactant-free oil that comprises sensing chemicals (e.g., chromoionophores, ionophores, and ion exchangers as described herein)).

As used herein, when a liquid in any form (e.g., a droplet or a continuous body, whether moving or stationary) is described as being "on", "at", or "over" a surface or microfluidic feature or structure, such liquid may be either in direct contact with the surface or microfluidic feature or structure or could be in contact with one or more layers or films that are interposed between the liquid and the surface or microfluidic feature or structure.

The term "sample" in the present specification and claims is used in its broadest sense. In some embodiments, a sample is or comprises an animal cell or tissue. In some embodiments, a sample includes a specimen or a culture (e.g., a microbiological culture) obtained from any source, as well as biological and environmental samples. Biological samples may be obtained from plants or animals (including humans) and encompass fluids, solids, tissues, and gases. Environmental samples include environmental material such as surface matter, soil, water, and industrial samples. These examples are not to be construed as limiting the sample types applicable to the present technology.

As used herein, a "biological sample" refers to a sample of biological tissue or fluid. For instance, a biological sample may be a sample obtained from an animal (including a human); a fluid, solid, or tissue sample; as well as liquid and solid food and feed products and ingredients such as dairy items, vegetables, meat and meat by-products, and waste. Biological samples may be obtained from all of the various families of domestic animals, as well as feral or wild animals, including, but not limited to, such animals as ungulates, bear, fish, lagomorphs, rodents, etc. Examples of biological samples include sections of tissues, blood, blood fractions, plasma, serum, urine, or samples from other peripheral sources or cell cultures, cell colonies, single cells, or a collection of single cells. Furthermore, a biological sample includes pools or mixtures of the above mentioned samples. A biological sample may be provided by removing a sample of cells from a subject, but can also be provided by using a previously isolated sample. For example, a tissue sample can be removed from a subject suspected of having a disease by conventional biopsy techniques. In some embodiments, a blood sample is taken from a subject. A biological sample from a patient means a sample from a subject suspected to be affected by a disease.

Environmental samples include environmental material such as surface matter, soil, water, and industrial samples, as well as samples obtained from food and dairy processing instruments, apparatus, equipment, utensils, disposable and non-disposable items. These examples are not to be construed as limiting the sample types applicable to the present invention.

As used herein, the term "biofluid" refers to a biological fluid (e.g., a body fluid, a bodily fluid). For example, in some embodiments, a biofluids is an excretion (e.g., urine, sweat, exudate (e.g., including plant exudate)) and in some embodiments a biofluid is a secretion (e.g., breast milk, bile). In some embodiments, a biofluid is obtained using a needle (e.g., blood, cerebrospinal fluid, lymph). In some embodiments, a biofluid is produced as a result of a pathological process (e.g., a blister, cyst fluid). In some embodiments, a biofluid is derived from another biofluid (e.g., plasma, serum). Exemplary biofluids include, but are not limited to, amniotic fluid, aqueous humor, vitreous humor, bile, blood, blood plasma, blood serum, breast milk, cerebrospinal fluid, cerumen (earwax), chyle, chime, endolymph, perilymph, exudates, feces, female ejaculate, gastric acid, gastric juice, lymph, mucus (e.g., nasal drainage, phlegm), pericardial fluid, peritoneal fluid, pleural fluid, pus, rheum, saliva, sebum (e.g., skin oil), serous fluid, semen, smegma, sputum, synovial fluid, sweat, tears, urine, vaginal secretion, and vomit.

The terms "specific binding" or "specifically binding" when used in reference to the interaction of two components A and B that associate with one another refers to an association of A and B having a $K_D$ that is smaller than the $K_D$ for the interaction of A or B with other similar components in the solution, e.g., at least one other molecular species in the solution that is not A or B. Accordingly, as used herein, the term "specific binding" refers to the binding of one material to another in a manner dependent upon the presence of a particular molecular structure. For example, an immunoglobulin will selectively bind an antigen that contains the chemical structures complementary to the ligand binding site(s) of the immunoglobulin and particular molecules will selectively bind particular analytes. This is in contrast to "non-specific binding" in which interactions are arbitrary and not based on structural compatibilities of the molecules and/or analytes.

As used herein, the word "presence" or "absence" (or, alternatively, "present" or "absent") is used in a relative sense to describe the amount or level of a particular entity (e.g., an analyte). For example, when an analyte is said to be "present" in a sample, it means the level or amount of this analyte is above a pre-determined threshold; conversely, when an analyte is said to be "absent" in a sample, it means the level or amount of this analyte is below a pre-determined threshold. The pre-determined threshold may be the threshold for detectability associated with the particular test used to detect the analyte or any other threshold. When an analyte is "detected" in a sample it is "present" in the sample; when an analyte is "not detected" it is "absent" from the sample. Further, a sample in which an analyte is "detected" or in which the analyte is "present" is a sample that is "positive" for the analyte. A sample in which an analyte is "not detected" or in which the analyte is "absent" is a sample that is "negative" for the analyte.

As used herein, an "increase" or a "decrease" refers to a detectable (e.g., measured) positive or negative change in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

The term "detection assay" refers to an assay for detecting the presence or absence of an analyte or the activity or effect of an analyte or for detecting the presence or absence of a variant of an analyte.

A "system" denotes a set of components, real or abstract, comprising a whole where each component interacts with or is related to at least one other component within the whole.

As used herein, the term "signaling molecule" (or "signaling moiety") refers to a composition of matter (e.g., a molecule and/or a moiety) that produces a detectable signal in response to a change in the environment of the signaling molecule. In some embodiments, a signaling molecule produces a detectable signal in response to a change in the binding of an analyte (e.g., association and/or dissociation of an analyte with the signaling molecule). In some embodiments, a signaling molecule produces a detectable signal in response to a change in the binding of a H+ and/or an OH− to the signaling molecule (e.g., resulting from a change in pH (e.g., that results from the association and/or dissociation of an analyte with a recognition molecule)).

As used herein, the term "recognition molecule" (or "recognition moiety") refers to a composition of matter (e.g., a molecule and/or a moiety) that interacts with an analyte of interest in either a covalent or noncovalent manner. In some embodiments, a signaling molecule is also a recognition molecule, e.g., one molecule or moiety both interacts with an analyte and produces a detectable signal in response to interacting with the analyte. In some embodiments, a first molecule is a signaling molecule and a second molecule is a recognition molecule, e.g., analyte interactions with the recognition molecule cause changes in the detectable signal produced by the signaling molecule. For instance, in some embodiments, association and/or dissociation of an analyte with the recognition molecule causes changes in the association and/or dissociation of $H^+$ and/or $OH^-$ with the signaling molecule (e.g., changes in pH) that produce changes in the production of a detectable signal by the signaling molecule.

As used herein, the term "exchanger molecule" is a molecule that promotes and/or maintains mass balance, charge balance, pH balance, osmotic balance, etc. in a phase (e.g., the oil phase and/or aqueous phase) caused by the movement of analytes, ions, H+, and/or other molecules between the oil phase and the aqueous droplet phase.

As used herein, the term "sensing molecule" is used to refer individually or collectively to a signaling molecule, recognition molecule, and/or an exchanger molecule as used in the technology provided herein.

As used herein, the term "recorded" refers to a process for storing information on computer readable medium.

DESCRIPTION

Embodiments of the technology described herein provide a chemical sensing strategy based on functionalization of the oil phase with a sensing chemical or a combination of sensing chemicals. In the technology described herein, the oil phase is both a sensor of analytes in the adjacent aqueous phase and a producer of droplets from a sample. The technology finds use in analyzing electrolytes and uncharged analytes in droplet microfluidics and provides assays for, e.g., small-volume medical diagnostics (e.g., in whole blood), ion channel studies on whole single cells, and microscale material syntheses.

Microfluidic Devices

Microfluidic technologies provide many advantages (see, e.g., S. R. Quake and A. Scherer, "From Micro to Nano Fabrication with Soft Materials," Science, vol. 290, pp. 1536-40, 2000). Generally, microfluidic devices handle small amounts of fluids, e.g., droplets having volumes of 1-1000 μL, 1-1000 nL, 1-1000 pL, or 1-1000 fL (e.g., 1, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 μL, nL, pL, or fL). Microfluidic devices typically have a small size and consume small amounts of reagents and energy. Finally, advantages of the technology are related to the behavior of small volumes of fluids with the microstructures of a microfluidic device. See, e.g., Squires and Quake (2005), "Microfluidics: Fluid physics at the nanoliter scale". Reviews of Modern Physics 77: 977, incorporated herein by reference in its entirety.

For example, the microfluidic technologies described herein provide a technology for detecting and/or quantifying analytes in droplets. In some embodiments, the high surface-to-volume ratio of microfluidic devices dramatically reduces reaction and/or detection times. Moreover, microfluidic devices provide for precise fluid handling. And, finally, microfluidics allows one to manipulate and to run parallel tests on a single small device.

In some embodiments of the technology provided herein, microfabrication techniques are used to produce a microfluidic device. For example, in some embodiments a microfluidic device is produced by a method comprising replica molding using soft lithography methods. In some embodiments, replica molding using soft lithography comprises producing microfluidic platforms from polydimethylsiloxane (PDMS). PDMS is a silicon rubber that provides advantages related to fabrication, physical properties, and economy (see, e.g., J. Friend and L. Yeo. "Fabrication of microfluidic devices using polydimethylsiloxane," Biomicrofluidics, vol. 4, pp: 026502, 2010). PDMS microfluidic platforms have further advantages related to transparency, gas permeability, and chemical stability (e.g., chemical inertness).

In various embodiments, microfluidic devices are fabricated from various materials using techniques such as laser stenciling, embossing, stamping, injection molding, masking, etching, three-dimensional printing, and three-dimensional soft lithography. Laminated microfluidic devices are further fabricated with adhesive interlayers or by thermal adhesiveless bonding techniques, such as by pressure treatment of oriented polypropylene. The microarchitecture of laminated and molded microfluidic devices can differ.

In some embodiments, microfluidic devices are fabricated from metal (e.g., a metal film), glass, silicon, diamond, a thermoplastic, or other polymeric material (e.g., polyurethane, PDMS, polyimide, polystyrene, polycarbonate, or polyisocyanoacrylate).

In some embodiments, microchannels are constructed of layers formed by extrusion molding. The flow characteristics of microchannels are significant because of the surface effects in the microflow regime. Surface tension and viscosity influence (e.g., enhance) surface roughness effects. In some embodiments, the narrowest dimension of a channel has the most profound effect on flow. Flow in channels that have rectangular or circular cross-sectional profiles is controlled by the diagonal width or diameter; thus, in some embodiments, channel design is typically varied to take advantage of this behavior. In some embodiments, reduction of taper in the direction of flow leads to a wicking effect for diameters below 200 micrometers. Conversely, flow can be stopped by opening a channel to form a bulb; then, flow can be restored by applying a pressure. Vias in a channel can be designed to promote directional flow, e.g., to provide a type of solid-state check valve.

In some embodiments, the microfluidic device comprises channels that generate droplets (e.g., from aqueous samples such as, e.g., biological samples and environmental samples). In some embodiments, the microfluidic device comprises channels and/or structures that provide a T-junction, flow-focusing junction, and/or a co-flow. In some embodiments, a T-junction, flow-focusing junction, and/or a co-flow forms droplets from a sample.

In some embodiments, microfluidic devices described herein are fabricated from an elastomeric polymer such as, e.g., polyisoprene, polybutadiene, polychlorophene, polyisobutylene, poly(styrene-butadiene-styrene), nitriles, polyurethanes, or polysilicones. In some embodiments, GE RTV 615, a vinyl-silane crosslinked (type) silicone elastomer (family) or polydimethysiloxane (PDMS) (e.g., sold as HT-6135 and HT-6240 from Bisco Silicons, Elk Grove, Ill.) is useful. The choice of materials typically depends upon the particular material properties (e.g., solvent resistance, stiffness, gas permeability, and/or temperature stability) required for the application being conducted. In some embodiments, elastomeric materials that are used in the manufacture of components of the microfluidic devices are described in Unger (2000) Science 288:113-116, incorporated herein by reference in its entirety. Some elastomers of the present devices are used as diaphragms. In some embodiments, elastomers are selected for their porosity, impermeability, chemical resistance, wetting, and passivating characteristics in addition to their stretch and relax properties. In some embodiments, an elastomer is selected for its thermal conductivity. For example, Micrometrics Parker Chomerics Therm A Gap material 61-02-0404-F574 (0.020" thick) is a soft elastomer (<5 Shore A) needing only a pressure of 5 to 10 psi to provide a thermal conductivity of 1.6 W/m-K.

In some embodiments, microfluidic devices are produced from PDMS as described in, e.g., S. R. Doonan, R. C. Bailey, Anal. Chem. 2017, 89, 4091-4099, which is incorporated herein by reference.

In some embodiments, microfluidic devices comprise channels having a channel depth of approximately 10-500 μm (10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 μm). in some embodiments, microfluidic devices comprise channels comprising a channel width of approximately 10-500 μm (e.g., 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 μm). See, e.g., FIG. 4 and FIG. 1.

In some embodiments, microfluidics devices comprise tubes connected by junctions such as T-junction or Y-junction. Tube fittings and connectors are used to form the junction.

Microfluidic Sensor

The technology provides a microfluidic device as described herein that is a microfluidic sensor comprising a functional "sensing oil" for detecting and/or quantifying analytes in droplets (e.g., aqueous droplets). The sensing oil is provided by dissolving sensing molecules (e.g., a system of sensing molecules that recognizes an analyte and produces a signal in response to the presence, absence, amount, and/or concentration of the analyte) in an appropriate oil that can both dissolve the sensing molecules and form droplets from samples. In some embodiments, the sensing oil (e.g., an oil comprising sensing molecules) is capable of forming droplets from aqueous samples such as biological (e.g., blood) and environmental samples. Thus, the technology provides a microfluidic sensing device comprising a sensing oil that is capable of both: 1) producing droplets from aqueous samples (e.g., biological and environmental samples); and detecting and/or quantifying analytes in the droplets.

In some embodiments, the sensing oil comprises sensing molecules that produce an optical signal or a change in an optical signal in the presence, absence, amount, and/or concentration of an analyte. In some embodiments, the optical signal is proportional to the amount and/or concentration of the analyte. In some embodiments, the optical signal is an increase in light (e.g., fluorescence) emission. In some embodiments, the optical signal is a decrease in light (e.g., fluorescence) emission. In some embodiments, the sensing oil comprises a fluorescent dye. In some embodiments, the fluorescent dye specifically binds the analyte. In some embodiments, the fluorescent dye specifically binds H+ in response to the present of an analyte (e.g., specifically bound to a recognition molecule). In some embodiments, the sensing oil comprises a chromoionophore, an ionophore, and/or an ion exchanger. The sensing oil and sensing molecules (e.g., sensing molecule systems) are described below.

In some embodiments, the microfluidic device comprising the sensing oil is capable of forming droplets that have a volume of 0.05 to 50 nL (e.g., 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.00, 2.00, 3.00, 4.00, 5.00, 6.00, 7.00, 8.00, 9.00, 10.00, 11.00, 12.00, 13.00, 14.00, 15.00, 16.00, 17.00, 18.00, 19.00, 20.00, 21.00, 22.00, 23.00, 24.00, 25.00, 26.00, 27.00, 28.00, 29.00, 30.00, 31.00, 32.00, 33.00, 34.00, 35.00, 36.00, 37.00, 38.00, 39.00, 40.00, 41.00, 42.00, 43.00, 44.00, 45.00, 46.00, 47.00, 48.00, 49.00, or 50.00 nl).

In some embodiments, the microfluidic device comprising the sensing oil is capable of forming sensing oil segments that have a volume of 0.05 to 50 nL (e.g., 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.00, 2.00, 3.00, 4.00, 5.00, 6.00, 7.00, 8.00, 9.00, 10.00, 11.00, 12.00, 13.00, 14.00, 15.00, 16.00, 17.00, 18.00, 19.00, 20.00, 21.00, 22.00, 23.00, 24.00, 25.00, 26.00, 27.00, 28.00, 29.00, 30.00, 31.00, 32.00, 33.00, 34.00, 35.00, 36.00, 37.00, 38.00, 39.00, 40.00, 41.00, 42.00, 43.00, 44.00, 45.00, 46.00, 47.00, 48.00, 49.00, or 50.00 nl).

In some embodiments, the flow rate of the sensing oil (e.g., sensing oil segments) in the microfluidic device is approximately 0.05 to 5 μl/minute (e.g., 0.05, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, 1.00, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, 2.00, 2.05, 2.10, 2.15, 2.20, 2.25, 2.30, 2.35, 2.40, 2.45, 2.50, 2.55, 2.60, 2.65, 2.70, 2.75, 2.80, 2.85, 2.90, 2.95, 3.00, 3.05, 3.10, 3.15, 3.20, 3.25, 3.30, 3.35, 3.40, 3.45, 3.50, 3.55, 3.60, 3.65, 3.70, 3.75, 3.80, 3.85, 3.90, 3.95, 4.00, 4.05, 4.10, 4.15, 4.20, 4.25, 4.30, 4.35, 4.40, 4.45, 4.50, 4.55, 4.60, 4.65, 4.70, 4.75, 4.80, 4.85, 4.90, 4.95, or 5.00 μl/minute).

In some embodiments, the flow rate of the sample (e.g., droplets) in the microfluidic device is approximately 0.05 to 5 μl/minute (e.g., 0.05, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, 1.00, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, 2.00, 2.05, 2.10, 2.15, 2.20, 2.25, 2.30, 2.35, 2.40, 2.45, 2.50, 2.55, 2.60, 2.65, 2.70, 2.75, 2.80, 2.85, 2.90, 2.95, 3.00, 3.05, 3.10, 3.15, 3.20, 3.25, 3.30, 3.35, 3.40, 3.45, 3.50, 3.55, 3.60, 3.65, 3.70, 3.75, 3.80, 3.85, 3.90, 3.95, 4.00, 4.05, 4.10, 4.15, 4.20, 4.25, 4.30, 4.35, 4.40, 4.45, 4.50, 4.55, 4.60, 4.65, 4.70, 4.75, 4.80, 4.85, 4.90, 4.95, or 5.00 µl/minute).

In some embodiments, the microfluidic device comprising the sensing oil is capable of forming sensing oil segments at a frequency of approximately 1 to 1000 Hz (e.g., 1, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 Hz).

In some embodiments, the microfluidic device comprising the sensing oil is capable of forming droplets at a frequency of approximately 1 to 1000 Hz (e.g., 1, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 Hz).

In some embodiments, the microfluidic device comprising the sensing oil is capable of detecting an analyte present in a droplet at a concentration of 1 to $10^{-12}$ M (e.g., 1, $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$ M). Accordingly, in some embodiments, the microfluidic device comprising the sensing oil is capable of detecting an analyte present in a sample at a concentration of 1 to $10^{-12}$ M (e.g., 1, $10^{-1}$, $10^{-2}$, $10^{-3}$, $10^{-4}$, $10^{-5}$, $10^{-6}$, $10^{-7}$ $10^{-8}$, $10^{-9}$, $10^{-10}$, $10^{-11}$, or $10^{-12}$M). In some embodiments, the microfluidic device comprising the sensing oil is capable of detecting an analyte present in a droplet at a concentration of 0.1 to 500 µg/ml (e.g., 0.1, 0.2, 0.3, 0.4, 0.5, 0.6, 0.7, 0.8, 0.9, 1.0, 1.0, 2.0, 3.0, 4.0, 5.0, 6.0, 7.0, 8.0, 9.0, 10.0, 10.0, 20.0, 30.0, 40.0, 50.0, 60.0, 70.0, 80.0, 90.0, 100.0, 110.0, 120.0, 130.0, 140.0, 150.0, 160.0, 170.0, 180.0, 190.0, 200.0, 210.0, 220.0, 230.0, 240.0, 250.0, 260.0, 270.0, 280.0, 290.0, 300.0, 310.0, 320.0, 330.0, 340.0, 350.0, 360.0, 370.0, 380.0, 390.0, 400.0, 410.0, 420.0, 430.0, 440.0, 450.0, 460.0, 470.0, 480.0, 490.0, or 500.0 µg/ml). In some embodiments, the microfluidic device comprising the sensing oil is capable of detecting an analyte present in a sample at a concentration of 0.1 to 500 µg/ml (e.g., 0.1, 0.2, 0.3, 0.4, 0.5, 0.6, 0.7, 0.8, 0.9, 1.0, 1.0, 2.0, 3.0, 4.0, 5.0, 6.0, 7.0, 8.0, 9.0, 10.0, 10.0, 20.0, 30.0, 40.0, 50.0, 60.0, 70.0, 80.0, 90.0, 100.0, 110.0, 120.0, 130.0, 140.0, 150.0, 160.0, 170.0, 180.0, 190.0, 200.0, 210.0, 220.0, 230.0, 240.0, 250.0, 260.0, 270.0, 280.0, 290.0, 300.0, 310.0, 320.0, 330.0, 340.0, 350.0, 360.0, 370.0, 380.0, 390.0, 400.0, 410.0, 420.0, 430.0, 440.0, 450.0, 460.0, 470.0, 480.0, 490.0, or 500.0 µg/ml).

In some embodiments, the microfluidic device comprising the sensing oil is capable of detecting an analyte present in a droplet or in a sample with a response time (e.g., to equilibrium) of less than 600 seconds (e.g., less than 600, 590, 580, 570, 560, 550, 540, 530, 520, 510, 500, 490, 480, 470, 460, 450, 440, 430, 420, 410, 400, 390, 380, 370, 360, 350, 340, 330, 320, 310, 300, 290, 280, 270, 260, 250, 240, 230, 220, 210, 200, 190, 180, 170, 160, 150, 140, 130, 120, 110, 100, 90, 80, 70, 60, 50, 40, 30, 20, 10, 9, 8, 7, 6, 5, 4, 3, 2, 1, 0.9, 0.8, 0.7, 0.6, 0.5, 0.4, 0.3, 0.2, or 0.1 seconds).

In some embodiments, the microfluidic device comprising the sensing oil is capable of detecting an analyte present in a droplet or in a sample (e.g., by detecting an optical signal produced by the oil phase) without interference by non-analytes in the aqueous phase.

Sensing Oil

Embodiments provide a sensing oil that is capable of forming droplets from a sample (e.g., an aqueous sample (e.g., a biological sample (e.g., a blood sample), an environmental sample, etc.)). In some embodiments, the sensing oil is capable of forming droplets from a sample (e.g., an aqueous sample (e.g., a biological sample (e.g., a blood sample), an environmental sample, etc.)) in a microfluidic device.

In some embodiments, the sensing oil comprises a signaling molecule that produces an optical signal in the presence and/or absence of the analyte or that produces an optical signal that is proportional to the amount and/or concentration of the analyte. Thus, in some embodiments, the signaling molecule is a recognition molecule that specifically binds the analyte and that produces the optical signal in response to binding analyte. As used herein, the term "optical signal" refers to a detectable change in color and/or intensity of one or more of a UV-visible absorbance, fluorescence, and/or luminescence.

In some embodiments, the signaling molecule is a pH sensitive molecule that produces the optical signal in response to a change in pH caused by the binding of the analyte to a separate recognition molecule that specifically binds the analyte. That is, in some embodiments, the sensing oil comprises a pH sensitive molecule that produces a signal and a recognition molecule that is specific for the analyte. Binding of the analyte to the recognition molecule causes a change in $H^+$ binding to the pH sensitive molecule and a change in the signal produced by the pH sensitive molecule.

In some embodiments, the sensing oil further comprises an exchanger molecule that maintains mass balance, charge balance, pH balance, osmotic balance, etc. in the oil phase caused by the movement of analytes, ions, H+, and/or other molecules between the oil phase and the aqueous droplet phase.

Accordingly, embodiments provide a sensing oil comprising a signaling molecule that is also an analyte recognition molecule. Some embodiments provide a sensing oil comprising a signaling molecule and a distinct, separate recognition molecule. Some embodiments provide a sensing oil comprising a signaling molecule and an exchanger molecule. Some embodiments provide a sensing oil comprising a signaling molecule, a recognition molecule, and an exchanger molecule.

Accordingly, embodiments provide a sensing oil comprising a first molecule that provides signaling functions and analyte recognition functions. Some embodiments provide a sensing oil comprising a first molecule that provides signaling functions and a second molecule that provides analyte recognition functions. Some embodiments provide a sensing oil comprising a first molecule that provides signaling functions and a second molecule that provides exchanger functions. Some embodiments provide a sensing oil comprising a first molecule that provides signaling functions, a second molecule that provides analyte recognition functions, and a third molecule that provides exchanger functions.

In various embodiments of the sensing oil described herein, the sensing oil is capable of producing droplets from a sample (e.g., a biological sample (e.g., a blood sample), an environmental sample). In some embodiments, the sensing oil is capable of producing droplets from a sample (e.g., a biological sample (e.g., a blood sample), an environmental sample) without comprising a surfactant. That is, in some embodiments, the sensing oil is a surfactant-free oil.

In some embodiments, the technology provides a sensing oil (e.g., and related microfluidic devices comprising a sensing oil) for detecting ions (e.g., singly or doubly charged ions (e.g., cations, anions). In some embodiments, the sensing oil for detecting ions comprises a signaling molecule that is a pH-sensitive dye (referred to herein in some embodiments as a "chromoionophore") and a recognition molecule (referred to herein in some embodiments as an "ionophore") that is specific for the ion. In some embodiments, the sensing oil for detecting ions further comprises an ion exchanger molecule.

Exemplary chromoionophores (e.g., pH-sensitive dye signaling molecules) include but are not limited to nile blue derivatives, rhodamine derivatives, fluorescein derivatives, and other dyes that are responsive to pH. In some embodiments, the pH sensitive dye signaling molecule is, e.g., chromoionophore I (3-octadecanoylimino-7-(diethylamino)-1,2-benzophenoxazine), chromoionophore II (9-dimethylamino-5-[4-(16-butyl-2,14-dioxo-3,15-dioxaeicosyl)phenylimino]benzo[a]phenoxazine), chromoionophore III (9-(diethylamino)-5-[(2-octyldecyl)imino]benzo[a]phenoxazine), chromoionophore IV (5-octadecanoyloxy-2-(4-nitrophenylazo)phenol), orchromoionophore VII (9-dimethylamino-5-[4-(15-butyl-1,13-dioxo-2,14-dioxanonadecyl)phenylimino]benzo[a]phenoxazine). In some embodiments, the dye undergoes change in color, UV-visible absorbance, fluorescence, and/or luminescence upon pH change.

Figure 11:
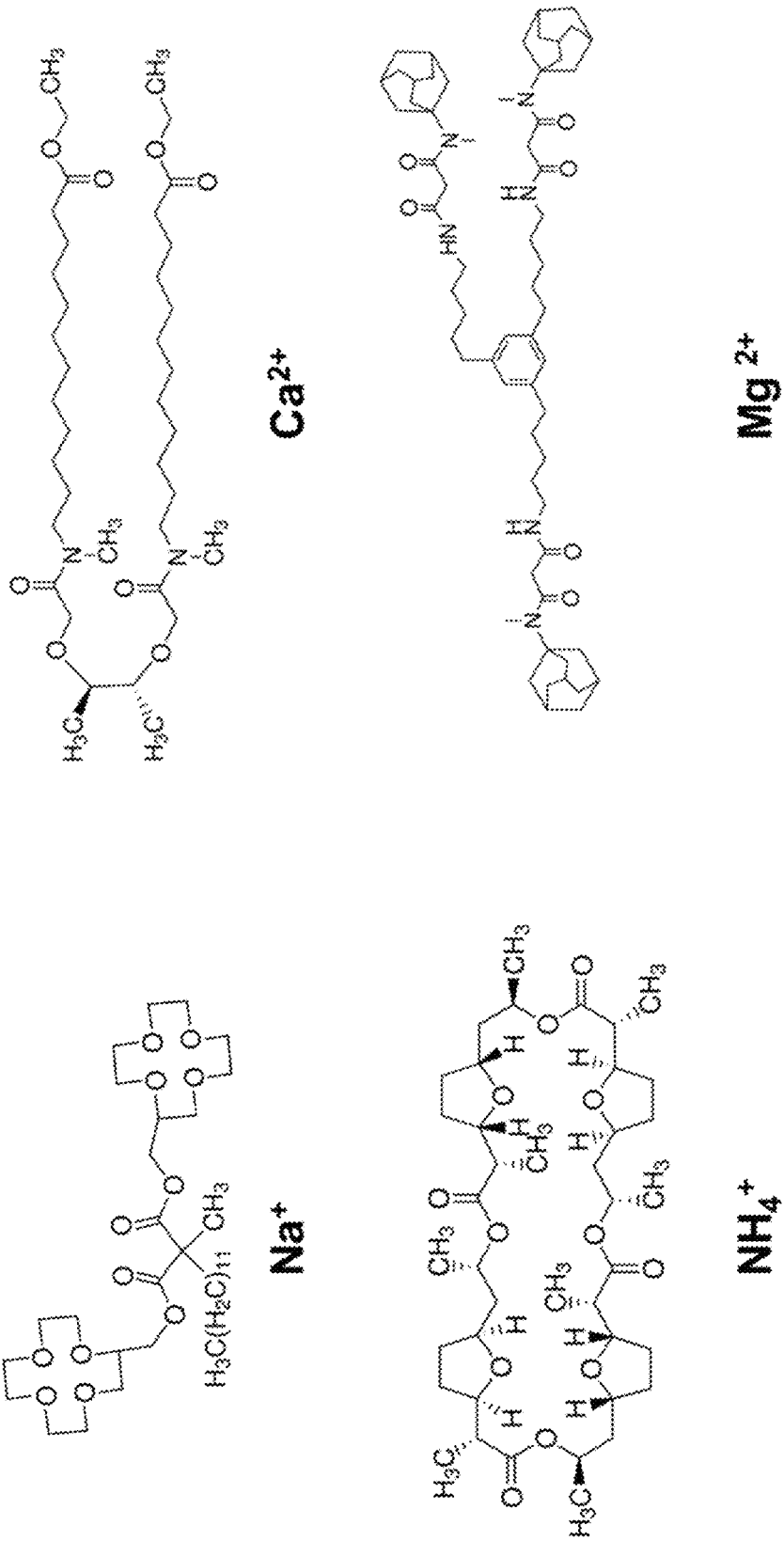
FIG. 11 shows the chemical structures of exemplary ionophores for sensing Na$^+$, Ca$^{2+}$, NH$_4^+$, and Mg$^{2+}$ analytes.

In some embodiments, the recognition molecule is a molecule that is capable of binding (e.g., specifically binding) to the analyte or reacting (e.g., specifically reacting) with the analyte. In some embodiments, the recognition molecule is an "ionophore" that binds a specific ionic species. In some embodiments, the recognition molecule is an ionophore that is, e.g., valinomycin, bis[(benzo-15-crown-5)-4'-ylmethyl] pimelate, or 2-dodecyl-2-methyl-1,3-propanediyl bis[N-[5'-nitro(benzo-15-crown-5)-4'-yl]carbamatel] for potassium ion recognition. In some embodiments, the recognition molecule is an ionophore that is, e.g., nonactin for ammonium ion recognition. In some embodiments, the recognition molecule is an ionophore that is, e.g., 4-tert-butylcalix[4]arene-tetraacetic acid tetraethyl ester, 2,3:11,12-didecalino-16-crown-5, 2,6,13,16,19-pentaoxapentacyclo[18.4.4.47,12.01,20.07,12] dotriacontane, or bis[(12-crown-4)methyl]dodecylmethylmalonate for sodium ion recognition. In some embodiments, the recognition molecule is an ionophore that is, e.g., (−)-(R,R)—N,N'-bis-[11-(ethoxycarbonyl)undecyl]-N,N',4,5-tetramethyl-3,6-dioxaoctane-diamide, N,N-dicyclohexyl-N',N'-dioctadecyl-3-oxapentanediamide, or N,N,N',N'-tetra[cyclohexyl]diglycolic acid diamide for calcium recognition. In some embodiments, the recognition molecule is an ionophore that is, e.g., 1,3,5-tris[10-(1-adamantyl)-7,9-dioxo-6,10-diazaundecyl]benzene or 4,13-[bis(N-adamantylcarbamoyl)acetyl]-1,7,10,16,tetraoxa-4,13-diazacyclooctadecane for magnesium ion recognition. In some embodiments, the recognition molecule is an ionophore that is, e.g., [9]mercuracarborand-3, 3,6-didodecyloxy-4,5-dimethyl-o-phenylene-bis(mercury chloride), or indium(III) octaethyl-porphyrin for chloride ion recognition. Some ionophores are shown in FIG. 11.

In some embodiments, the sensing oil for detecting ions comprises an exchanger molecule (e.g., an ion exchanger molecule) such as, e.g., anionic tetraphenylborate derivatives, cationic quaternary ammonium, or other lipophilic ions.

In some embodiments, the technology provides a sensing oil (e.g., and related microfluidic devices comprising a sensing oil) for detecting polyions (e.g., mulitply charged ions (e.g., cations, anions). In some embodiments, the sensing oil for detecting polyions comprises a signaling molecule that is a pH-sensitive dye (referred to herein in some embodiments as a "chromoionophore"). Exemplary chromoionophores (e.g., pH-sensitive dye signaling molecules) include but are not limited to nile blue derivatives, rhodamine derivatives, fluorescein derivatives, and other dyes that are responsive to pH. In some embodiments, the pH sensitive dye signaling molecule is, e.g., chromoionophore I (3-octadecanoylimino-7-(diethylamino)-1,2-benzophenoxazine), chromoionophore II (9-dimethylamino-5-[4-(16-butyl-2,14-dioxo-3,15-dioxaeicosyl)phenylimino]benzo[a]phenoxazine), chromoionophore III (9-(diethylamino)-5-[(2-octyldecyl)imino]benzo[a]phenoxazine), chromoionophore IV (5-octadecanoyloxy-2-(4-nitrophenylazo)phenol), orchromoionophore VII (9-dimethylamino-5-[4-(15-butyl-1,13-dioxo-2,14-dioxanonadecyl)phenylimino]benzo[a]phenoxazine). In some embodiments, the dye undergoes change in color, UV-visible absorbance, fluorescence, and/or luminescence upon pH change.

In some embodiments, the sensing oil for detecting polyions comprises an exchanger molecule (e.g., an ion exchanger molecule), e.g., that forms cooperative ion pairs with the target polyionic analytes. Exemplary exchanger molecules that find use in polyion sensing oils include, but are not limited to, anionic tetraphenylborate derivatives, cationic quaternary ammonium, dinonylnaphthalene sulfonate, and other lipophilic ions.

The technology provides a sensing oil for forming droplets from samples and detecting analytes in droplets. Accordingly, the technology comprises embodiments of an oil that is capable of dissolving sensing chemicals (e.g., a signaling molecule and, optionally, an exchanger molecule; or a signaling molecule and a recognition molecule and, optionally, an exchanger molecule) to provide a sensing oil that is capable of forming droplets from samples such as, e.g., biological samples (e.g., blood and other biofluids) and environmental samples. Exemplary oils that find use in the technology provided herein include, e.g., dioctyl sebacate, mineral oil, hexadecane, 4-3-phenylpropylpyridine, dichloroethane, and fluorous oils such as perfluorotributylamine.

Recognition Molecules and Moieties

A variety of recognition molecules find use in the present invention. In some embodiments, the recognition molecule is provided in a sensing oil (e.g., as described herein). In some embodiments, a "recognition molecule" is utilized to bind to or otherwise interact with another molecule or molecules (e.g., one or more analytes). In some embodiments, a signaling molecule is also a recognition molecule (e.g., one molecule provides both the signaling and recognition functions). In some embodiments, a recognition molecule is not a signaling molecule (e.g., a first molecule provides the signaling function and a second molecule provides the recognition function).

In some embodiments, the recognition molecule comprises an organic functional group. In some embodiments, the organic functional group is an amine, carboxylic acid, drug, chelating agent, crown ether, cyclodextrin, or a combination thereof. In some embodiments, the recognition molecule is a biomolecule. In some embodiments, the biomolecule is a protein, antigen binding protein, peptide, nucleic acid (e.g., single nucleotides or nucleosides, oligonucleotides, polynucleotides, and single- and higher-stranded nucleic acids), or a combination thereof. In some embodiments, the recognition molecule is biotin. In some embodiments, the recognition molecule is an antigen binding protein. Examples of antigen binding proteins finding use in the present technology include, but are not limited to, immunoglobulins, single chain antibodies, chimeric antibodies, polyclonal antibodies, monoclonal antibodies, and F(ab')2, Fab', and Fab fragments.

In some embodiments, the recognition molecule comprises a drug moiety. The drug moieties can be agents already accepted for clinical use or they can be drugs whose use is experimental, or whose activity or mechanism of action is under investigation. The drug moieties can have a proven action in a given disease state or can be only hypothesized to show desirable action in a given disease state. In some embodiments, the drug moieties are compounds that are being screened for their ability to interact with an analyte of choice. As such, drug moieties that are useful in practicing the instant technology include drugs from a broad range of drug classes having a variety of pharmacological activities.

When the recognition molecule comprises a chelating agent, crown ether, or cyclodextrin, host-guest chemistry describes the interaction between the recognition molecule and the analyte. The use of host-guest chemistry allows a great degree of recognition molecule-analyte specificity to be engineered into embodiments of the technology. The use of these compounds to bind to specific compounds is well known to those of skill in the art. See, for example, Pitt et al. "The Design of Chelating Agents for the Treatment of Iron Overload" in INORGANIC CHEMISTRY IN BIOLOGY AND MEDICINE; Martell, A. E., Ed.; American Chemical Society, Washington, D.C., 1980, pp. 279-312; Lindoy, L. F., THE CHEMISTRY OF MACROCYCLIC LIGAND COMPLEXES; Cambridge University Press, Cambridge, 1989; Dugas, H., BIOORGANIC CHEMISTRY; Springer-Verlag, New York, 1989, each of which is incorporated herein by reference.

Additionally, methods for attaching chelating agents, crown ethers, and cyclodextrins to other molecules is available to those of skill in the art. See, for example, Meares et al., "Properties of In Vivo Chelate-Tagged Proteins and Polypeptides" in MODIFICATION OF PROTEINS: FOOD, NUTRITIONAL, AND PHARMACOLOGICAL ASPECTS" Feeney, R. E., Whitaker, R., Eds., American Chemical Society, Washington, D. C., 1982, pp. 370-387; Kasina et al. Bioconjugate Chem. 9:108-117 (1998); Song et al., Bioconjugate Chem. 8:249-255 (1997), each of which is incorporated herein by reference.

In some embodiments, the recognition molecule is a biomolecule such as a protein, nucleic acid, peptide, or an antibody. Biomolecules useful in practicing the present invention can be derived from any source. The biomolecules can be isolated from natural sources or can be produced by synthetic methods. Proteins can be natural proteins or mutated proteins. Mutations can be produced by chemical mutagenesis, site-directed mutagenesis, or other means of inducing mutations known to those of skill in the art. Proteins useful in practicing the instant invention include, for example, enzymes, antigens, antibodies, and receptors. Antibodies can be either polyclonal or monoclonal. Peptides and nucleic acids can be isolated from natural sources or can be wholly or partially synthetic in origin.

In some embodiments, the recognition moiety is a cyclodextrin or modified cyclodextrin. Cyclodextrins are a group of cyclic oligosaccharides produced by numerous microorganisms. Cyclodextrins have a ring structure which has a basket-like shape. This shape allows cyclodextrins to include many kinds of molecules into their internal cavity (See, for example, Szejtli, J., CYCLODEXTRINS AND THEIR INCLUSION COMPLEXES; Akademiai Klado, Budapest, 1982; and Bender et al., CYCLODEXTRIN CHEMISTRY, Springer-Verlag, Berlin, 1978, incorporated herein by reference). Cyclodextrins are able to form inclusion complexes with an array of organic molecules including, for example, drugs, pesticides, herbicides, and agents of war (See, Tenjarla et al., J. Pharm. Sci. 87:425-429 (1998); Zughul et al., Pharm. Dev. Technol. 3:43-53 (1998); and Albers et al., Crit. Rev. Ther. Drug Carrier Syst, 12:311-337 (1995), incorporated herein by reference). Importantly, cyclodextrins are able to discriminate between enantiomers of compounds in their inclusion complexes. Thus, in some embodiments, the technology provides for the detection of a particular enantiomer in a mixture of enantiomers (See, Koppenhoefer et al. *J Chromatogr. A* 793:153-164 (1998), incorporated herein by reference).

In still further embodiments, the recognition molecule interacts with a ligand. Examples of ligands include, but are not limited to, small organic molecules such as steroid molecules and small drug molecules, proteins, polypeptides and peptides, metal ions, and nucleic acids. In some embodiments, the ligands or recognition molecules are complexed with a lipid. The present technology contemplates complexation of the recognition molecule with a variety of lipids and lipid containing materials, including, but not limited to, fatty acids, phospholipids, mono-, di- and tri-glycerides comprising fatty acids and/or phospholipids, lipid bilayers, and liposomes. In some embodiments, the present technology utilizes liposomes. A variety of methods are useful for producing liposomes. Such methods are described in detail in numerous articles and have been reviewed in texts such as New (New, Liposomes: A Practical Approach, IRL Press, Oxford, [1989]), and Rosoff (Rosoff, Vesicles, Marcel Dekker, Inc., New York, [1996]) among others. See also, U.S. Pat. Nos. 6,183,772, 6,306,598, 6,180,784, 6,740,643, and 6,706,922, all of which are incorporated herein by reference, for methods of forming liposomes and other lipid containing materials. In some embodiments, ligands or recognition molecules are covalently linked to the head groups of lipid monomers. In other embodiments, ligands or recognition molecules are covalently linked to the surface of a lipid containing material (e.g., proteins and antibodies with multiple amine and thiol linkages to the material surface). In still other embodiments, ligands or recognition molecules are non-covalently incorporated into the biopolymeric material (e.g., ganglioside incorporated into the membrane of films and liposomes).

Methods

Embodiments of the technology relate to methods of detecting and/or quantifying an analyte. For example, in some embodiments, methods comprise providing a microfluidic device comprising a sensing oil as described herein. In some embodiments, methods comprise obtaining, producing, and/or providing a sample, e.g., as an input to a microfluidic device as described herein. In some embodiments, methods comprise obtaining, producing, and/or providing a sensing oil as described herein, e.g., to a microfluidic device to form droplets from a sample and to detect the presence, absence, amount, and/or concentration of an analyte. In some embodiments, methods comprise forming droplets from a sample.

In some embodiments, methods comprise producing a sensing oil, e.g., by dissolving one or more sensing molecules in an oil to produce a sensing oil. In some embodiments, methods comprise dissolving a signaling molecule in an oil to produce a sensing oil. In some embodiments, methods comprise dissolving a signaling molecule and a recognition molecule in an oil to produce a sensing oil. In some embodiments, methods comprise dissolving a signaling molecule and an exchanger molecule in an oil to produce a sensing oil. In some embodiments, methods comprise dissolving a signaling molecule, a recognition molecule, and an exchanger molecule in an oil to produce a sensing oil.

In some embodiments, the technology provides methods for producing and/or using a sensing oil and, in some embodiments, producing and/or using related microfluidic devices comprising a sensing oil, for detecting ions (e.g., singly or doubly charged ions (e.g., cations, anions). In some embodiments, methods comprise producing a sensing oil for detecting ions, wherein the sensing oil comprises a signaling molecule that is a pH-sensitive dye (referred to herein in some embodiments as a "chromoionophore") and a recognition molecule (referred to herein in some embodiments as an "ionophore") that is specific for the ion. In some embodiments, methods of producing a sensing oil for detecting ions further comprises dissolving an ion exchanger molecule in an oil.

In some embodiments, methods comprise dissolving a chromoionophore in an oil to provide a sensing oil. In some embodiments, methods comprise dissolving a nile blue derivative, rhodamine derivative, fluorescein derivative, or other dye that is responsive to pH in an oil to produce a sensing oil. In some embodiments, methods comprise dissolving a pH sensitive dye signaling molecule that is, e.g., chromoionophore I (3-octadecanoylimino-7-(diethylamino)-1,2-benzophenoxazine), chromoionophore II (9-dimethylamino-5-[4-(16-butyl-2,14-dioxo-3,15-dioxaeicosyl) phenylimino]benzo[a]phenoxazine), chromoionophore III (9-(diethylamino)-5-[(2-octyldecyl)imino]benzo[a]phenoxazine), chromoionophore IV (5-octadecanoyloxy-2-(4-nitrophenylazo)phenol), or chromoionophore VII (9-dimethylamino-5-[4-(15-butyl-1,13-dioxo-2,14-dioxanonadecyl)phenylimino]benzo[a]phenoxazine) in an oil to produce a sensing oil.

In some embodiments, methods comprise dissolving a recognition molecule in an oil to produce a sensing oil. In some embodiments, methods comprise dissolving a recognition molecule that is an "ionophore" in an oil to produce a sensing oil. In some embodiments, methods comprise dissolving a recognition molecule that is, e.g., valinomycin, bis[(benzo-15-crown-5)-4'-ylmethyl] pimelate, or 2-dodecyl-2-methyl-1,3-propanediyl bis[N-[5'-nitro(benzo-15-crown-5)-4'-yl]carbamate] in an oil to produce a sensing oil for potassium ion recognition (e.g., detection and/or quantification). In some embodiments, methods comprise dissolving a recognition molecule that is, e.g., nonactin in an oil to produce a sensing oil for ammonium ion recognition (e.g., detection and/or quantification). In some embodiments, methods comprise dissolving a recognition molecule that is, e.g., 4-tert-butylcalix[4]arene-tetraacetic acid tetraethyl ester, 2,3:11,12-didecalino-16-crown-5, 2,6,13,16,19-pentaoxapentacyclo[18.4.4.47,12.01,20.07,12] dotriacontane, or bis[(12-crown-4)methyl]dodecylmethylmalonate in an oil to produce a sensing oil for sodium ion recognition (e.g., detection and/or quantification). In some embodiments, methods comprise dissolving a recognition molecule that is, e.g., (−)-(R,R)—N,N'-bis-[11-(ethoxycarbonyl)undecyl]-N, N',4,5-tetramethyl-3,6-dioxaoctane-diamide, N,N-dicyclohexyl-N',N'-dioctadecyl-3-oxapentanediamide, or N,N,N', N'-tetra[cyclohexyl]diglycolic acid diamide in an oil to produce a sensing oil for calcium recognition (e.g., detection and/or quantification). In some embodiments, methods comprise dissolving a recognition molecule that is, e.g., 1,3,5-tris[10-(1-adamantyl)-7,9-dioxo-6,10-diazaundecyl]benzene or 4,13-[bis(N-adamantylcarbamoyl)acetyl]-1,7,10,16, tetraoxa-4,13-diazacyclooctadecane in an oil to produce a sensing oil for magnesium ion recognition (e.g., detection and/or quantification). In some embodiments, methods comprise dissolving a recognition molecule that is, e.g., [9]mercuracarborand-3, 3,6-didodecyloxy-4,5-dimethyl-o-phenylene-bis(mercury chloride), or indium(III) octaethylporphyrin in an oil to produce a sensing oil for chloride ion recognition (e.g., detection and/or quantification).

In some embodiments, methods comprise dissolving both a signaling molecule (e.g., a chromoionophore) and a recognition molecule (e.g., an ionophore) in an oil to provide a sensing oil.

In some embodiments, methods further comprise dissolving an exchanger molecule in an oil (e.g., in a sensing oil comprising a signaling molecule and/or a recognition molecule). In some embodiments, methods comprise dissolving an exchanger molecule that is, e.g., an anionic tetraphenylborate derivative, cationic quaternary ammonium, dinonylnaphthalene sulfonate, or other lipophilic ion in an oil (e.g., in a sensing oil comprising a signaling molecule and/or a recognition molecule).

Exemplary oils that find use in the methods provided herein include, e.g., dioctyl sebacate, mineral oil, hexadecane, 4-3-phenylpropylpyridine, dichloroethane, and fluorous oils such as perfluorotributylamine. In some embodiments, methods comprise obtaining, providing, and/or producing an oil, e.g., for use in producing a sensing oil.

In some embodiments, methods comprise forming droplets from a sample (e.g., a biological sample, an environmental sample) using a sensing oil. In some embodiments, forming droplets comprises contacting a sample flowing in a channel of a microfluidic device with a sensing oil, e.g., to a tubing comprising a sensing oil. In some embodiments, contacting a sample occurs in a T-junction, a flow-focusing junction, or at a microfluidic element for co-flow. In some embodiments, forming droplets from a sample comprises producing segments of a sensing oil and droplets comprising sample that proceed linearly through a microfluidic channel. In some embodiments, forming droplets from a sample comprises producing alternating segments of a sensing oil and droplets comprising sample that proceed linearly through a microfluidic channel.

In some embodiments, methods comprise detecting an analyte. In some embodiments, detecting an analyte comprises detecting an optical signal produced from a segment of a sensing oil. In some embodiments, detecting an analyte comprises recording an optical signal produced by a segment of a sensing oil as a function of time. In some embodiments, detecting an analyte comprises recording an optical signal produced by a segment of a sensing oil as a function of distance traveled through a microfluidic channel and/or a tubing. In some embodiments, methods comprise detecting an optical signal produced by a plurality of segments of a sensing oil. In some embodiments, detecting an analyte comprises averaging a plurality of optical signals produced by a plurality of segments of a sensing oil. In some embodiments, optical signals produced by a one or more segments of a sensing oil are recorded over a period of 0.01 to 100 seconds (e.g., 0.01, 0.02, 0.05, 0.1, 0.2, 0.5, 1, 2, 5, 10, 20, 50, or 100 seconds). In some embodiments, optical signals produced by a one or more segments of a sensing oil are recorded over a distance of 0.01 to 100 cm (e.g., (e.g., 0.01, 0.02, 0.05, 0.1, 0.2, 0.5, 1, 2, 5, 10, 20, 50, or 100 cm). In some embodiments, the optical signals from 1 to 100 segments (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 segments) of a sensing oil are recorded and/or analyzed.

In some embodiments, methods comprise detecting a change in the color, UV-visible absorbance, fluorescence, and/or luminescence of a dye in response to a change in pH. In some embodiments, detecting an optical signal comprises detecting a change in color and/or absorbance of a segment of a sensing oil. In some embodiments, detecting an optical signal comprises detecting a change in fluorescence produced by a segment of a sensing oil. In some embodiments, detecting an optical signal comprises detecting a change in luminescence produced by a segment of a sensing oil.

In some embodiments, methods comprise calculating a concentration and/or an amount of an analyte. In some embodiments, methods comprise calculating the volume of a droplet (e.g., comprising sample and/or comprising analyte).

In some embodiments, an optical signal is produced by a segment of a sensing oil within 0.1 to 5.0 seconds (e.g., 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 seconds) of the segment of sensing oil contacting a droplet comprising sample and/or analyte. In some embodiments, an optical signal is produced by a segment of a sensing oil within 1 to 600 seconds (e.g., 1, 2, 5, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, or 600 seconds) of the segment of sensing oil contacting a droplet comprising sample and/or analyte. As described herein, an optical signal is produced by the interaction of an analyte (e.g., in an aqueous droplet) and a signaling molecule (e.g., in an oil segment). In various embodiments of the technology, the sizes of the oil segments and aqueous droplets can vary as described herein. Accordingly, one of ordinary skill in the art understands that the optical signal produced by a segment of a sensing oil depends on the interaction of an analyte with a signaling molecule and that the length of time between contact of an aqueous droplet with an oil segment and production of a detectable signal may vary depending on the sizes of the oil segments and aqueous droplets.

Analytes

The term "analyte" as used herein is a broad term and is used in its ordinary sense, including, without limitation, to refer to a substance or chemical constituent in a sample such as a biological fluid (for example, blood, serum, plasma, sweat, saliva, tears, interstitial fluid, cerebral spinal fluid, lymph fluid, or urine) or environmental sample that can be analyzed. Analytes can include naturally occurring substances, artificial substances, metabolites, and/or reaction products. In some embodiments, the analyte comprises a salt, ion (e.g., a cation, an anion), polyion, sugar, protein, fat, vitamin, or hormone. In some embodiments, the analyte is naturally present in a biological sample (e.g., is "endogenous"); for example, in some embodiments, the analyte is a metabolic product, a hormone, an antigen, an antibody, and the like. Alternatively, in some embodiments, the analyte is introduced into a biological organism (e.g., is "exogenous"), for example, a drug, drug metabolite, a drug precursor (e.g., prodrug), a contrast agent for imaging, a radioisotope, a chemical agent, etc. The metabolic products of drugs and pharmaceutical compositions are also contemplated analytes.

In some embodiments, the analyte is $H^+$ or $OH^-$. In some embodiments, the analyte is a cation, e.g., $NH_4^+$, $Li^+$, $Na^+$, $K^+$, $Ca^{2+}$, $Mg^{2+}$, $Pb^{2+}$, $Zn^{2+}$, $Cd^{2+}$, $Hg^{2+}$, $Ag^+$, $Fe^{2+}$, or $Fe^{3+}$. In some embodiments, the analyte is an anion, e.g., $Cl^-$, $I^-$, $F^-$, or an inorganic anion such as, e.g., $NO_3^-$, $NO_2^-$, $SO_4^{2-}$, or $CO_3^{2-}$. See, e.g., P. Buhlmann; L. D. Chen, in *Supramolecular Chemistry: From Molecules to Nanomaterials* (Eds.: J. W. Steed, P. Gale), John Wiley & Sons, Ltd, New York, 2012, 2539-2579, incorporated herein by reference. In some embodiments, the analyte is an organic ion (e.g., creatinine, a choline derivative), a polyion (e.g., protamine, heparin, nucleic acid (e.g., RNA, DNA)), or an uncharged organic molecule (e.g., phenols, boronic acids, saccharides, or $H_2O_2$).

In some embodiments, the analyte is an analyte that is clinically relevant and that provides the basis for a laboratory or clinical test. See, e.g., We, Alan H. B. *Tietz clinical guide to laboratory tests* (4th ed., Saunders/Elsevier 2006)), incorporated herein by reference.

In some embodiments, the analyte is a polypeptide, a nucleic acid, a small molecule, a lipid, a carbohydrate, a polysaccharide, a fatty acid, a phospholipid, a glycolipid, a sphingolipid, an organic molecule, an inorganic molecule, cofactor, pharmaceutical, bioactive agent, a cell, a tissue, an organism, etc. In some embodiments, the analyte comprises a polypeptide, a nucleic acid, a small molecule, a lipid, a carbohydrate, a polysaccharide, a fatty acid, a phospholipid, a glycolipid, a sphingolipid, an organic molecule, an inorganic molecule, cofactor, pharmaceutical, bioactive agent, a cell, a tissue, an organism, etc. In some embodiments, the analyte comprises a combination of one or more of a polypeptide, a nucleic acid, a small molecule, a lipid, a carbohydrate, a polysaccharide, a fatty acid, a phospholipid, a glycolipid, a sphingolipid, an organic molecule, an inorganic molecule, cofactor, pharmaceutical, bioactive agent, a cell, a tissue, an organism, etc.

In some embodiments, the analyte is part of a multimolecular complex, e.g., a multiprotein complex, a nucleic acid/protein complex, a molecular machine, an organelle (e.g., a cell-free mitochondrion, e.g., in plasma; a plastid; golgi, endoplasmic reticulum, vacuole, peroxisome, lysosome, and/or nucleus), cell, virus particle, tissue, organism, or any macromolecular complex or structure or other entity that can be specifically bound by a signaling molecule and/or a recognition molecule and is amenable to analysis by the technology described herein (e.g., a ribosome, spliceosome, vault, proteasome, DNA polymerase III holoenzyme, RNA polymerase II holoenzyme, symmetric viral capsids, GroEL/GroES; membrane protein complexes: photosystem I, ATP synthase, nucleosome, centriole and microtubule-organizing center (MTOC), cytoskeleton, flagellum, nucleolus, stress granule, germ cell granule, or neuronal transport granule). For example, in some embodiments a multimolecular complex is isolated and the technology finds use in characterizing, identifying, quantifying, and/or detecting one or more molecules (analytes) associated with (e.g., that is a component of) the multimolecular complex. In some embodiments an extracellular vesicle is isolated and the technology finds use in characterizing, identifying, quantifying, and/or detecting one or more molecules (analytes) associated with the vesicle. In some embodiments, the technology finds use in characterizing, identifying, quantifying, and/or detecting a protein (e.g., a surface protein) and/or an analytes present inside the vesicle, e.g., a protein, nucleic acid, or other analyte described herein. In some embodiments, the vesicle is fixed and permeabilized prior to analysis.

As used herein, the terms "detect an analyte" or "detect a substance" will be understood to encompass direct detection of the analyte itself or indirect detection of the analyte by detecting its by-product(s).

Samples and Sample Handling

The technology relates to the processing of samples (e.g., biological samples, environmental samples) in droplets and detecting analytes in droplets produced from samples. Examples of samples include various fluid samples. In some embodiments, the sample is a bodily fluid sample from a subject. In some embodiments, the sample includes one or more fluid component. In some embodiments, solid or semi-solid samples are provided. In some embodiments, the sample comprises tissue collected from a subject. In some embodiments, the sample comprises a bodily fluid, secretion, and/or tissue of a subject. In some embodiments, the sample is a biological sample. In some embodiments, the biological sample is a bodily fluid, a secretion, and/or a tissue sample. Examples of biological samples include but are not limited to, blood, serum, saliva, urine, gastric and digestive fluid, tears, stool, semen, vaginal fluid, interstitial fluids derived from tumorous tissue, ocular fluids, sweat, mucus, earwax, oil, glandular secretions, breath, spinal fluid, hair, fingernails, skin cells, plasma, nasal swab or nasopharyngeal wash, spinal fluid, cerebral spinal fluid, tissue, throat swab, biopsy, placental fluid, amniotic fluid, cord blood, emphatic fluids, cavity fluids, sputum, pus, micropiota, meconium, breast milk, and/or other excretions. In some embodiments, the sample is provided from a human or an animal, e.g., in some embodiments the sample is provided from a mammal (e.g., a vertebrate) such as a murine, simian, human, farm animal, sport animal, or pet. In some embodiments, the sample is collected from a living subject and in some embodiments the sample is collected from a dead subject.

In some embodiments, the sample is collected fresh from a subject and in some embodiments the sample has undergone some form of pre-processing, storage, or transport, e.g., by a microfluidic device described herein and that provides input droplets at the droplet inlet of a device as described herein.

In some embodiments, the sample is provided to a microfluidic device from a subject without undergoing intervention or much elapsed time. In some embodiments, the subject contacts the microfluidic device to provide the sample. In some embodiments, the sample is provided to the microfluidic device described herein by another microfluidic device that processes a sample prior to delivery to an embodiment of the microfluidic sensing device described herein.

In some embodiments, a subject provides a sample and/or the sample may be collected from a subject. In some embodiments, the subject is a patient, clinical subject, or pre-clinical subject. In some embodiments, the subject is undergoing diagnosis, treatment, and/or disease management or lifestyle or preventative care. The subject may or may not be under the care of a health care professional.

In some embodiments, the sample is collected from the subject by puncturing the skin of the subject or without puncturing the skin of the subject. In some embodiments, the sample is collected through an orifice of the subject. In some embodiments, a tissue sample (e.g., an internal or an external tissue sample) is collected from the subject. In some embodiments, the sample is collected from a portion of the subject including, but not limited to, the subject's finger, hand, arm, shoulder, torso, abdomen, leg, foot, neck, ear, or head.

In some embodiments, one type of sample is accepted and/or processed by the microfluidic device. Alternatively, in some embodiments multiple types of samples are accepted and/or processed by the microfluidic device. For example, in some embodiments the microfluidic device is capable of accepting one or more, two or more, three or more, four or more, five or more, six or more, seven or more, eight or more, nine or more, ten or more, twelve or more, fifteen or more, twenty or more, thirty or more, fifty or more, or one hundred or more types of samples. In some embodiments, the microfluidic device is capable of accepting and/or processing any of these numbers of sample types simultaneously and/or at different times from different or the same matrices. For example, in some embodiments the microfluidic device is capable of assaying one or multiple types of samples, e.g., the technology provides a plurality of microfluidic sensing devices operating in parallel.

The technology is not limited in the volume of sample that is processed by the microfluidic device. Accordingly, embodiments provide that any volume of sample is provided from the subject or from another source. Examples of volumes may include, but are not limited to, approximately 10 mL or less, 5 mL or less, 3 mL or less, 1 mL or less, 500 µL or less, 300 µL or less, 250 µL or less, 200 µL or less, 170 µL or less, 150 µL or less, 125 µL or less, 100 µL or less, 75 µL or less, 50 µL or less, 25 µL or less, 20 µL or less, 15 µL or less, 10 µL or less, 5 µL or less, 3 µL or less, 1 µL or less, 500 nL or less, 250 nL or less, 100 nL or less, 50 nL or less, 20 nL or less, 10 nL or less, 5 nL or less, 1 nL or less, 500 µL or less, 100 µL or less, 50 µL or less, or 1 µL or less. The amount of sample may be approximately a drop of a sample. The amount of sample may be approximately 1 to 5 drops of sample, 1 to 3 drops of sample, 1 to 2 drops of sample, or less than a drop of sample. The amount of sample may be the amount collected from a pricked finger or fingerstick. Any volume, including those described herein, is provided to the device in various embodiments.

Further, in some embodiments a sample collection unit and/or sample reaction chamber is integral to the microfluidic device. And, in some embodiments, the sample collection unit and/or sample reaction chamber is separate from the microfluidic device. In some embodiments, the sample collection unit and/or sample reaction chamber is removable and/or insertable from the microfluidic device or is removable and/or insertable from an apparatus comprising the microfluidic device. In some embodiments, the sample collection unit and/or sample reaction chamber is provided in the microfluidic device; in some embodiments the sample collection unit and/or sample reaction chamber is not provided in the microfluidic device. In some embodiments, the microfluidic device is removable and/or insertable from an apparatus.

In some embodiments, a sample collection unit and/or sample reaction chamber is configured to receive a sample. In some embodiments, the sample collection unit is capable of containing and/or confining the sample. In some embodiments, the sample collection unit is capable of conveying the sample to the microfluidic device.

In some embodiments, a microfluidic device is configured to accept a single sample; in some embodiments a microfluidic device is configured to accept multiple samples. In some embodiments, the multiple samples comprise multiple types of samples. For example, in some embodiments a single microfluidic device handles a single sample at a time. For example, in some embodiments a microfluidic device receives a single sample and performs one or more sample processing steps, such as a lysis steps, isolation steps, reaction steps, and/or a separation steps with the sample. In some embodiments, the microfluidic device completes processing a sample before accepting a new sample.

In other embodiments, a microfluidic device is capable of handling multiple samples simultaneously. In one example, a microfluidic device receives multiple samples simultaneously. In some embodiments, the multiple samples comprise multiple types of samples. Alternatively, in some embodiments the microfluidic device receives samples in sequence. Samples are provided in some embodiments to the microfluidic device one after another or, in some embodiments, samples are provided to the microfluidic device after any amount of time has passed. A microfluidic device in some embodiments begins sample processing on a first sample, receives a second sample during said sample processing, and processes the second sample in parallel with the first sample. In some embodiments, the first and second samples are not the same type of sample. In some embodiments, the microfluidic device processes any number of samples in parallel, including but not limited to more than and/or equal to approximately one sample, two samples, three samples, four samples, five samples, six samples, seven samples, eight samples, nine samples, ten samples, eleven samples, twelve samples, thirteen samples, fourteen samples, fifteen samples, sixteen samples, seventeen samples, eighteen samples, nineteen samples, twenty samples, twenty-five samples, thirty samples, forty samples, fifty samples, seventy samples, one hundred samples.

In some embodiments, the microfluidic device processes one, two, or more samples in parallel. The number of samples that are processed in parallel may be determined by the number of available modules, reaction chambers, and/or components in the microfluidic device.

When a plurality of samples is processed simultaneously, embodiments provide that the samples begin and/or end processing at any time. For example, the samples need not begin and/or end processing at the same time. In some embodiments, a first sample has completed processing while a second sample is still being processed. In some embodiments, the second sample has begun processing after the first sample has begun processing. As samples have completed processing, additional samples are added to the device in some embodiments. In some embodiments, the microfluidic device runs continuously with samples being added to the device as various samples have completed processing.

In some embodiments, multiple samples are provided simultaneously. In some embodiments, multiple samples are not the same type of sample. In some embodiments, multiple sample collection units are provided to a microfluidic device. In some embodiments, the multiple sample collection units receive samples simultaneously and in some embodiments the multiple sample collection units receive samples at different times. In some embodiments, multiples of any of the sample collection mechanisms described herein are used in combination.

In some embodiments, multiple samples are provided in sequence. In some embodiments, multiple sample collection units are used and in some embodiments single sample collection units are used. Embodiments provide any combination of sample collection mechanisms described herein. In some embodiments, a microfluidic device accepts one sample at a time, two samples at a time, or more. In some embodiments, samples are provided to the microfluidic device after any amount of time has elapsed.

Computer and Software

In some embodiments, the technology described herein is associated with a programmable machine designed to perform a sequence of arithmetic, logical, or control operations, e.g., as provided by the methods described herein, either contiguous to the microfluidic device, proximate, or utilized in concert. For example, some embodiments of the technology are associated with (e.g., implemented in) computer software and/or computer hardware. In one aspect, the technology relates to a computer comprising a form of memory, an element for performing arithmetic, logical, and/or control operations, and a processing element (e.g., a processor or a microprocessor) for executing a series of instructions (e.g., a method as provided herein) to read, manipulate, and store data. Some embodiments comprise one or more processors. In some embodiments, a processor provides instructions to control one or more valves, components, modules, thermoelectric components, piezoelectric components, pumps, reagent supplies, etc. in the microfluidic device and/or apparatus. In some embodiments, a processor provides instructions to control a detection means such as a fluorescence detector and/or spectrophotometer.

In some embodiments, a microprocessor is part of a system comprising one or more of a CPU, a graphics card, a user interface (e.g., comprising an output device such as a display and an input device such as a keyboard), a storage medium, and memory components. Memory components (e.g., volatile and/or nonvolatile memory) find use in storing instructions (e.g., an embodiment of a process as provided herein) and/or data. Programmable machines associated with the technology comprise conventional extant technologies and technologies in development or yet to be developed (e.g., a quantum computer, a chemical computer, a DNA computer, an optical computer, a spintronics based computer, etc.).

Some embodiments provide a computer that includes a computer-readable medium. The embodiment includes a random access memory (RAM) coupled to a processor. The processor executes computer-executable program instructions stored in memory. Such processors may include a microprocessor, an ASIC, a state machine, or other processor, and can be any of a number of computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor, such as the processor of client, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, Swift, Ruby, Unix, and JavaScript. In some embodiments, instructions are provided by National Instruments LabView.

Computers are connected in some embodiments to a network or, in some embodiments, can be stand-alone machines. Computers may also include a number of external or internal devices such as a mouse, a CD-ROM, DVD, a keyboard, a display, or other input or output devices. Examples of computers are personal computers, digital assistants, personal digital assistants, cellular phones, mobile phones, smart phones, pagers, digital tablets, laptop computers, internet appliances, and other processor-based devices. In general, the computer-related to aspects of the technology provided herein may be any type of processor-based platform that operates on any operating system, such as Microsoft Windows, Linux, UNIX, macOS, etc., capable of supporting one or more programs comprising the technology provided herein. All such components, computers, and systems described herein as associated with the technology may be logical or virtual.

Data Collection and Analysis

In some embodiments, assay data are produced, e.g., comprising or calculated from signals detected, evaluated, and/or recorded by a detection means. Following the production of assay data, the assay data are reported to a data analysis operation in some embodiments. Data may be stored on the device, telemetered to a proximate data storage means or at a distance via bluetooth or other contained transmission means or via connectivity to the world-wide web. To facilitate data analysis in some embodiments, the assay data are analyzed by a digital computer. In some embodiments, the computer is appropriately programmed for receipt and storage of the assay data and for analysis and reporting of the assay data gathered, e.g., to provide data in a human or machine readable format.

In some embodiments, a computer-based analysis program is used to translate the data generated by an assay into data of predictive value for a clinician. The clinician can access the predictive data using any suitable means. Thus, in some preferred embodiments, the present invention provides the further benefit that the clinician, who is not likely to be trained in genetics or molecular biology, need not understand the raw data. The data is presented directly to the clinician in its most useful form. The clinician is then able to utilize the information immediately to optimize the care of the subject. The present invention contemplates any method capable of receiving, processing, and transmitting the information to and from laboratories conducting the assays, information providers, medical personal, and subjects.

Kits

In some embodiments, the technology provides a kit. In some embodiments, kits comprise a microfluidic sensor as described herein. In some embodiments, kits comprise a sensing oil as provided herein. In some embodiments, kits comprise a microfluidic sensor as described herein and a sensing oil as described herein. In some embodiments, kits comprise a positive control for an analyte and in some embodiments, kits comprise a negative control. In some embodiments, kits are provided for use with a detection apparatus. In some embodiments, kits are provided with components used for preparing a sample (e.g., buffer, lysing agents, stabilizers). In some embodiments, kits are provided with components for obtaining a sample (e.g., a needle, syringe, lancet, or other sample collector).

Systems

In some embodiments, the technology provides a system. For example, in some embodiments, a system comprises a microfluidic device and a sensing oil as described herein. In some embodiments, a system further comprises a detection means. In some embodiments, a system further comprises a computer. In some embodiments, the system comprises a component for flow control, e.g., a component that provides a pressure to control flow of sensing oil and/or droplets in a microfluidic device. In some embodiments, systems comprise a component configured to provide pressure-driven, gravity-driven, vacuum-driven, and/or mechanical pump-driven (e.g., infusion pump, peristaltic pump, reciprocating pump, syringe pump, etc.) flow of sensing oil and/or droplets. In some embodiments, systems comprise a detection means, e.g., a light detector, a fluorescence detector, or a spectrophotometer.

Some embodiments comprise a fluorescence detector, e.g., a detector comprising an intensified charge coupled device (ICCD), an electron-multiplying charge coupled device (EM-CCD), a complementary metal-oxide-semiconductor (CMOS), a photomultiplier tube (PMT), an avalanche photodiode (APD), and/or another detector capable of detecting fluorescence emission from single chromophores. Some particular embodiments comprise a component configured for lens-free imaging, e.g., a lens-free microscope, e.g., a detection and/or imaging component for directly imaging on a detector (e.g., a CMOS) without using a lens.

System embodiments comprise analytical processes (e.g., embodied in a set of instructions, e.g., encoded in software, that direct a microprocessor to perform the analytical processes) to detect and/or quantify an analyte. In some embodiments, analytical processes use the optical signal intensity, spatial position data, and/or timing data (e.g., start, end, or length of time) of a signal for an analyte as input data.

In accordance with such a computer system, some embodiments of the technology provided herein further comprise functionalities for collecting, storing, and/or analyzing data (e.g., presence, absence, amount, and/or concentration of an analyte). For example, some embodiments contemplate a system that comprises a processor, a memory, and/or a database for, e.g., storing and executing instructions, analyzing fluorescence data, performing calculations using the data, transforming the data, and storing the data.

Some embodiments comprise comparing the amount, concentration, state, presence, or absence of analyte as described above to a previously determined value of amount, concentration, state, presence, or absence of analyte for a known analyte concentration.

Some embodiments comprise use of a standard curve (e.g., generated with one or more compositions comprising a standard reference material of the target analyte having known concentrations) to determine the concentration of the target analyte in the sample.

In some embodiments, an equation comprising variables representing the presence, absence, concentration, or amount of one or more analytes produces a value that finds use in making a diagnosis or assessing the presence or qualities of an analyte. As such, in some embodiments this value is presented by a device, e.g., by an indicator related to the result (e.g., an LED, an icon on a display, a sound, or the like). In some embodiments, a device stores the value, transmits the value, or uses the value for additional calculations. In some embodiments, an equation comprises variables representing the presence, absence, concentration, amount, or properties of one or more analytes.

Thus, in some embodiments, the present technology provides the further benefit that a clinician, who is not likely to be trained in analytical assays, need not understand the raw data. The data are presented directly to the clinician in its most useful form. The clinician is then able to utilize the information to optimize the care of a subject. The present technology contemplates any method capable of receiving, processing, and transmitting the information to and from laboratories conducting the assays, information providers, medical personal, and/or subjects. The data may be displayed to the clinician by any suitable method. For example, in some embodiments, a profiling service generates a report that can be printed for the clinician (e.g., at the point of care) or displayed to the clinician on a computer monitor. In some embodiments, the information is first analyzed at the point of care or at a regional facility. The raw data are then sent to a central processing facility for further analysis and/or to convert the raw data to information useful for a clinician or patient. The central processing facility provides the advantage of privacy (all data are stored in a central facility with uniform security protocols), speed, and uniformity of data analysis. The central processing facility can then control the fate of the data following treatment of the subject. For example, using an electronic communication system, the central facility can provide data to the clinician, the subject, or researchers. In some embodiments, the subject is able to access the data using the electronic communication system. The subject may choose further intervention or counseling based on the results. In some embodiments, the data are used for research use. For example, the data may be used to further optimize the inclusion or elimination of analytes as useful indicators of a particular condition associated with the disease.

Uses

The technology finds use in the assay of biological, environmental, and other samples. For example, the technology finds use in the clinical analysis of samples (e.g., biological samples). In some embodiments, the technology finds use in research, chemical synthesis, and environmental monitoring.

Although the disclosure herein refers to certain illustrated embodiments, it is to be understood that these embodiments are presented by way of example and not by way of limitation.

EXAMPLES

Materials and Methods

Reagents Chromoionophore I, chromoionophore III, potassium ionophore II, sodium tetrakis[3,5-bis(trifluoromethyl)phenyl]borate (NaTFPB), potassium tetrakis[3,5-bis (trifluoromethyl)phenyl]borate (KTFPB), tetradodecylammonium nitrate (TDDAN3), tridodecylmethylammonium chloride (TDMACl), dioctyl sebacate, 1,2-dichloroethane, protamine sulfate salt from salmon, heparin sodium salt from porcine intestinal mucosa, hydrogen peroxide (30% (w/w) in $H_2O$), TRIZMA base, HEPES (4-(2-hydroxyethyl)-1-piperazineethanesulfonic acid), sodium phosphate dibasic and sodium phosphate monobasic were purchased from MilliporeSigma. Sodium ionophore IV and [9]mercuracarborand-3 were obtained from Euvive, LLC. Dinonylnaphthalene sulfonic acid (DNNSH) was a gift from King Industries. The boronic acid-functionalized boron-azadipyrromethene (azaBDPBA) was a gift from Dechen Jiang group at Nanjing University. Venous sheep blood was obtained from Department of Surgery at the University of Michigan.

Instruments Fluorescence fluctuation spectroscopy was performed on an ISS Alba time-resolved confocal microscope equipped with a 20× dry objective lens. An avalanche photodiode (APD) detector was used. Bright-field images of the segmented flow were collected on the confocal microscope by using a high-speed camera (Phantom Miro eX2, Vision Research). A PTI Quanta Master fluorimeter was used to acquire fluorescence spectra of the bulk oil solutions. Visible absorption spectra were obtained on a PerkinElmer LAMBDA 35 UV-Vis spectrophotometer.

Figure 4:
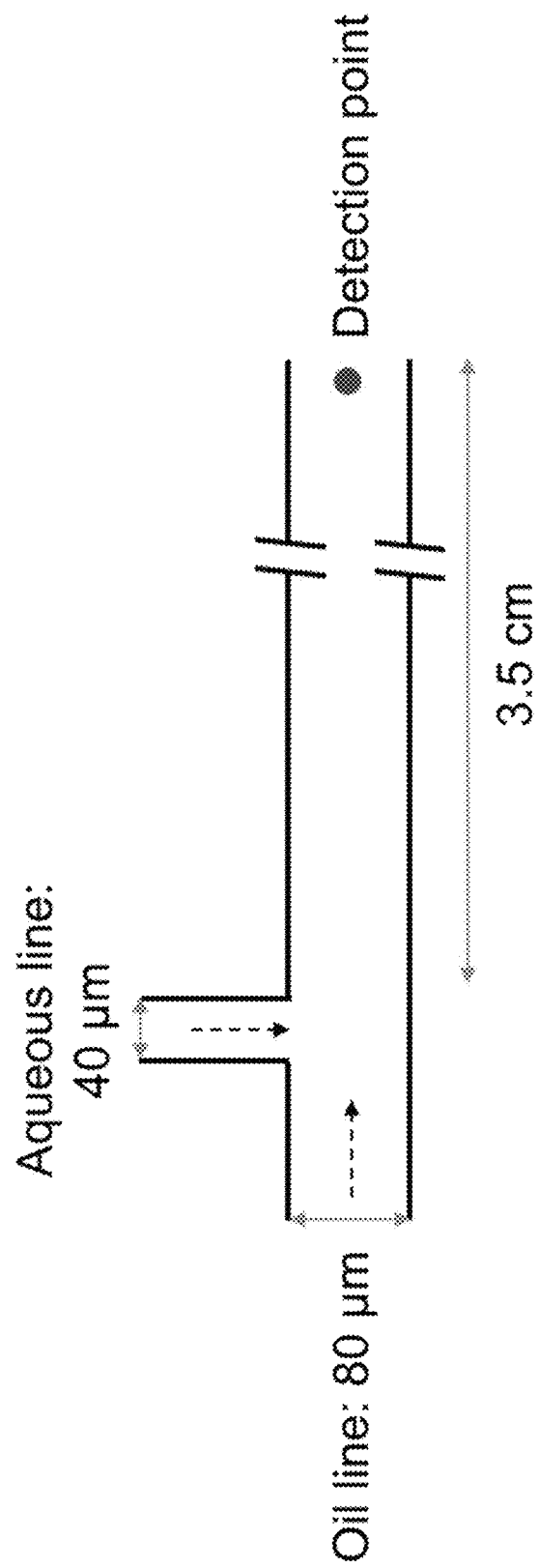
FIG. 4 is a drawing showing channel parameters of a microfluidic device tested during the development of embodiments of the technology described herein.

Chip fabrication The PDMS chip bonded onto a PDMS-coated glass side was fabricated according to a conventional soft-lithography protocol (see, e.g., 1. S. R. Doonan, R. C. Bailey, Anal. Chem. 2017, 89, 4091-4099, incorporated herein by reference). The channel depth was 40 m. Other channel parameters are shown in FIG. 4.

Sensing oilsolutions The $K^+$-sensing oil for fluorescent analysis was dioctyl sebacate (FIG. 2A-2C) containing 57 μg/mL (100 μM) chromoionophore III, 177 μg/mL (200 M) NaTFPB, and 216 μg/mL (300 μM) potassium ionophore II. To follow the color change of the oil segments in the microchannel (FIG. 2A), the sensing chemicals are 5-fold more concentrated in the oil. The $Na^+$-sensing oil was dioctyl sebacate containing 57 μg/mL (100 μM) chromoionophore III, 180 μg/mL (200 μM) KTFPB, and 180 μg/mL (400 μM) sodium ionophore IV. The $Cl^-$-sensing oil was dioctyl sebacate containing 47 μg/mL (80 μM) chromoionophore I, 93 g/mL (120 M) $TDDANO_3$, and 370 μg/mL (360 μM) [9]mercuracarborand-3. The protamine-sensing oil was 1,2-dichloroethane containing 2.9 μg/mL (5 M) of chromoionophore I and 2.3 g/mL (5 M) of DNNSH. The $H_2O_2$-sensing oil was dioctyl sebacate containing 41 μg/mL (70 μM) azaBDPBA and 40 μg/mL (70 μM) TDMACl. Sonication was employed to dissolve chemicals in dioctyl sebacate.

Droplet microBuidics Both aqueous and oil solutions were loaded into Hamilton glass syringes. Two precision syringe pumps (Pump 11 Pico Plus Elite) were used to infuse the aqueous solution and the oil solution to the microfluidics chip at the same flow rate. The flow rate was 2 μL/min in $K^+$ and $Na^+$ measurements. The flow rates were 1.5 μL/min, 3 μL/min, and 1 μL/min for sensing of $Cl^-$, protamine, and $H_2O_2$, respectively.

Cation Sensor

During the development of embodiments of the technology provided herein, experiments were conducted to test optical sensing of cations (e.g., $K^+$) using the droplet microfluidics technology described herein. In the particular embodiment of a cation-sensing technology (see, e.g., FIG. 1), the cation sensor comprises three components dissolved in a water-immiscible oil: 1) a hydrophobic sensing chemical (e.g., a pH indicator dye (e.g., a fluorescent chromoionophore)) that provides an optical read-out element; 2) an ionophore that provides an ion recognition element; and 3) a cation exchanger that minimizes and/or eliminates interference from dissolved anions. In the embodiment shown, two infusion pumps are used to merge the oil phase with an aqueous solution (e.g., sample) at a T-junction microchannel to generate segmented flow (e.g., of alternating aqueous droplets and oil droplets). For a buffered aqueous sample without the target cations, protons from this sample transfer into the oil phase and protonate the chromoionophore that has an appropriate $pK_a$. This transfer of protons from the aqueous phase to the oil phase was accompanied by a transfer of hydrophilic $Na^+$ from the oil phase to the aqueous droplets to conserve the electroneutrality of the oil phase. In contrast, when the aqueous sample contains target cations, these ions are extracted into the oil segment due to the very high binding affinity of the ionophore and the target ion. This ionic complexation process competes with the protonation of the chromoionophore, and the degree of protonation determines the absorbance and fluorescence properties of the pH-sensitive dye in the oil segment.

Figure 3:
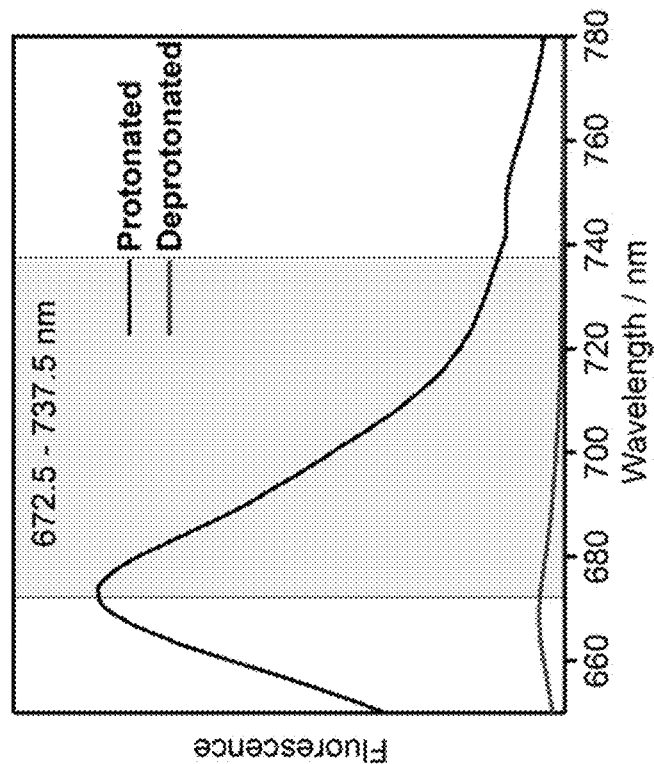
FIG. 3 shows the visible absorbance (left) and fluorescence (right) spectra of the protonated and deprotonated chromoionophore III in dicotyl sebacate.
Figure 3:
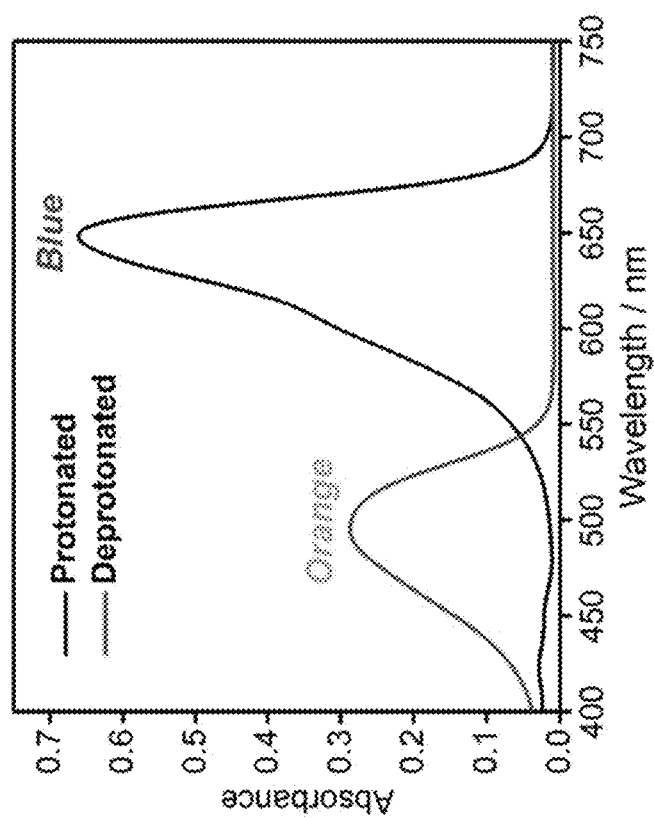

The color and fluorescence were acquired by high-speed bright-field video and time-resolved laser-induced fluorescence, respectively, at the distal end of the downstream channel, which was 3.5 cm from the junction. The color and fluorescence data indicated that the oil segment had a blue color when the $K^+$ concentration was low and the oil segment had an orange color when the $K^+$ concentration was high (FIG. 2A). The color difference was produced by the protonated and deprotonated chromoionophore, respectively (see, e.g., FIG. 3, left panel, for the absorbance spectra). The color difference was small because of the short optical path length (40 μm) in the microchannel. Accordingly, fluorescence fluctuation spectroscopy was used to provide a more sensitive signal upon which to perform quantitative ion analysis. Based on the fluorescence spectra of the protonated and deprotonated chromoionophore in bulk dioctyl sebacate (see, e.g., FIG. 3, right panel, for the fluorescence spectra), an excitation laser at 630 nm and an emission wavelength band of 672.5-737.5 nm were chosen. As is shown in FIG. 2B, significant fluorescence was observed for the oil segment phase control comprising completely protonated chromoionophore (e.g., in the presence of 0.1 M HCl) because of the high hydrophobicity of the dye (chromoionophore III, log P=10.5). Higher concentrations of $K^+$ in the aqueous phase samples leads to a lower fraction of protonated chromoionophore molecules, which yields less fluorescence in the oil segment due to the unfavored charge transfer between the donor and acceptor groups in the chromoionophore. The mean fluorescence signals (F) of all oil segments during a 0.5-s period were obtained from a Gaussian fit of the photons (per 25 second) emitted from the oil segments. The fluorescence of the completely protonated ($F_{max}$) and deprotonated chromoionophore ($F_{min}$) in the segmented oil was acquired when the aqueous phase comprised 0.1 M HCl and 0.1 M NaOH, respectively. Then, the degree of protonation (1–α) was calculated by the following equation:

$$1-\alpha=[CH^+]/[C_T]=1-(1+F_{max}-F/F-F_{min})$$

where [CH$^+$] is the concentration of the protonated chromoionophore, and [$C_T$] is the total concentration of the chromoionophore. As is convention in the field of ion-selective optodes (X. Xie, E. Bakker, Anal. Bioanal. Chem. 2015, 407, 3899-3910, incorporated herein by reference), we plotted the degree of protonation against the concentration of the analyte ion in the aqueous phase to provide the calibration curve (FIG. 2C). Because of the specificity of the ionophore, this fluorescence sensing method is at least 1000-fold more sensitive toward $K^+$ than other cations including $Na^+$, $Li^+$, $Ca^{2+}$, and $Mg^{2+}$ (FIG. 2C).

Based on the flow rate (2 μl/min for each phase) and the frequency of segment generation (approximately 41 segments per second for each phase), the volume of each oil segment is approximately 0.8 nL and the volume of each droplet is approximately 0.8 nL. A test time of 0.5 s corresponds to an aqueous sample volume of approximately 17 nL and approximately 21 measurement events. Because of the negligible variation between different oil segments and their fluorescence intensities, further reduction in the test time is possible. The use of an ultra-small volume of sample to perform a test provides a technology for minimally invasive diagnostics such as those based on fingerstick blood sampling or a microneedle-based painless blood draw, especially when a large number of parameters are to be quantified from one tiny sample.

Figure 5:
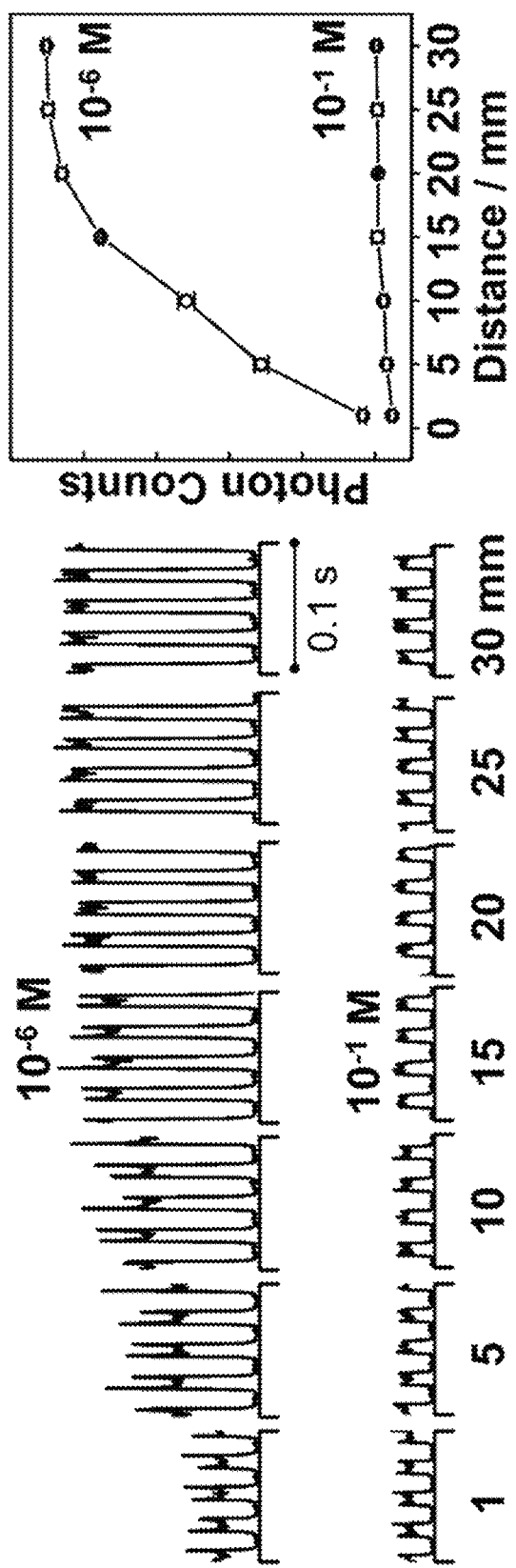
FIG. 5 shows the fluorescence of the segmented flow at different points along the channel after the merging junction.

FIG. 5 shows the fluorescence change as a function of distance along the channel after droplet generation. When the aqueous phase comprises $10^{-6}$ M KCl, the fluorescence of the oil phase reaches 95% of the equilibrium intensity after 25 mm of travel, corresponding to the process of chromoionophore protonation. This 25-mm distance of travel takes approximately 1.8 s based on a flow rate of approximately 170 m per 12 ms (each segment). For a high concentration of $K^+$, the chromoionophore in the oil phase will become partially protonated or remains unprotonated, which takes a shorter time to reach equilibrium. Such response times are tens of times shorter than conventional polymeric membrane type ion-selective optodes with a thickness of 1-3 μm (M. Bamsey, A. Berinstain, M. Dixon, Anal. Chim. Acta 2012, 737, 72-82, incorporated herein by reference) and microsphere type ion-selective optodes with a diameter of approximately 20 μm (N. Ye, K. Wygladacz, E. Bakker, Anal. Chim. Acta 2007, 596, 195-200, incorporated herein by reference). This response time is also shorter than ion sensing in parallel flow-based microfluidics (H. Song, D. L. Chen, R. F. Ismagilov, Angew. Chem. Int. Ed. 2006, 45, 7336-7356, incorporated herein by reference). Without being bound by theory and with an understanding that an understanding of the theory is not needed to practice the technology, it is contemplated that the very fast response time is related to the lower viscosity of the pure liquid oil phase compared to the commonly used polymer-plasticizer mixture and the enhanced convection within both aqueous droplets and oil segments due to the friction-induced internal flow circulation (H. Song, D. L. Chen, R. F. Ismagilov, Angew. Chem. Int. Ed. 2006, 45, 7336-7356, incorporated herein by reference).

Blood Samples

Figure 6A:
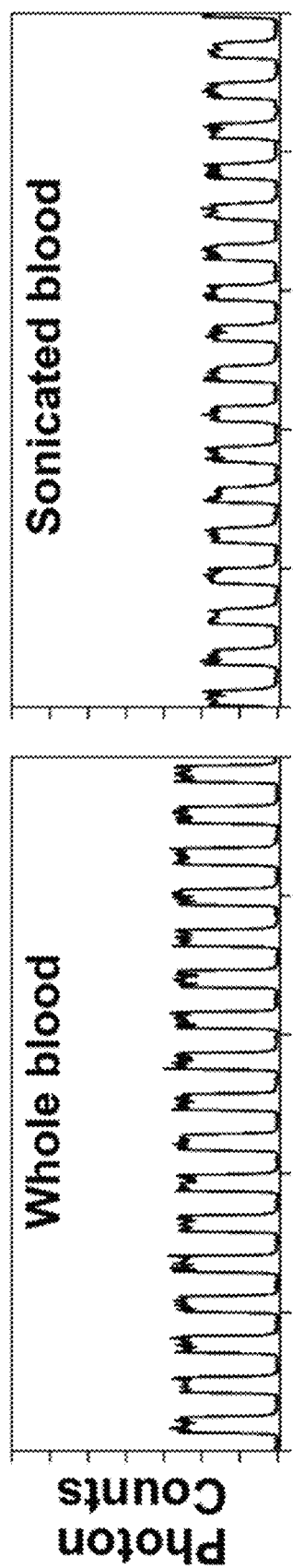
FIG. 6A shows fluorescence traces of the segmented flow for analysis of whole blood (left) and sonicated whole blood (right). A 1:1 dilution of the whole blood with 0.1 M Tris-HCl buffer at pH 7.4 was employed to control the sample pH.
Figure 6B:
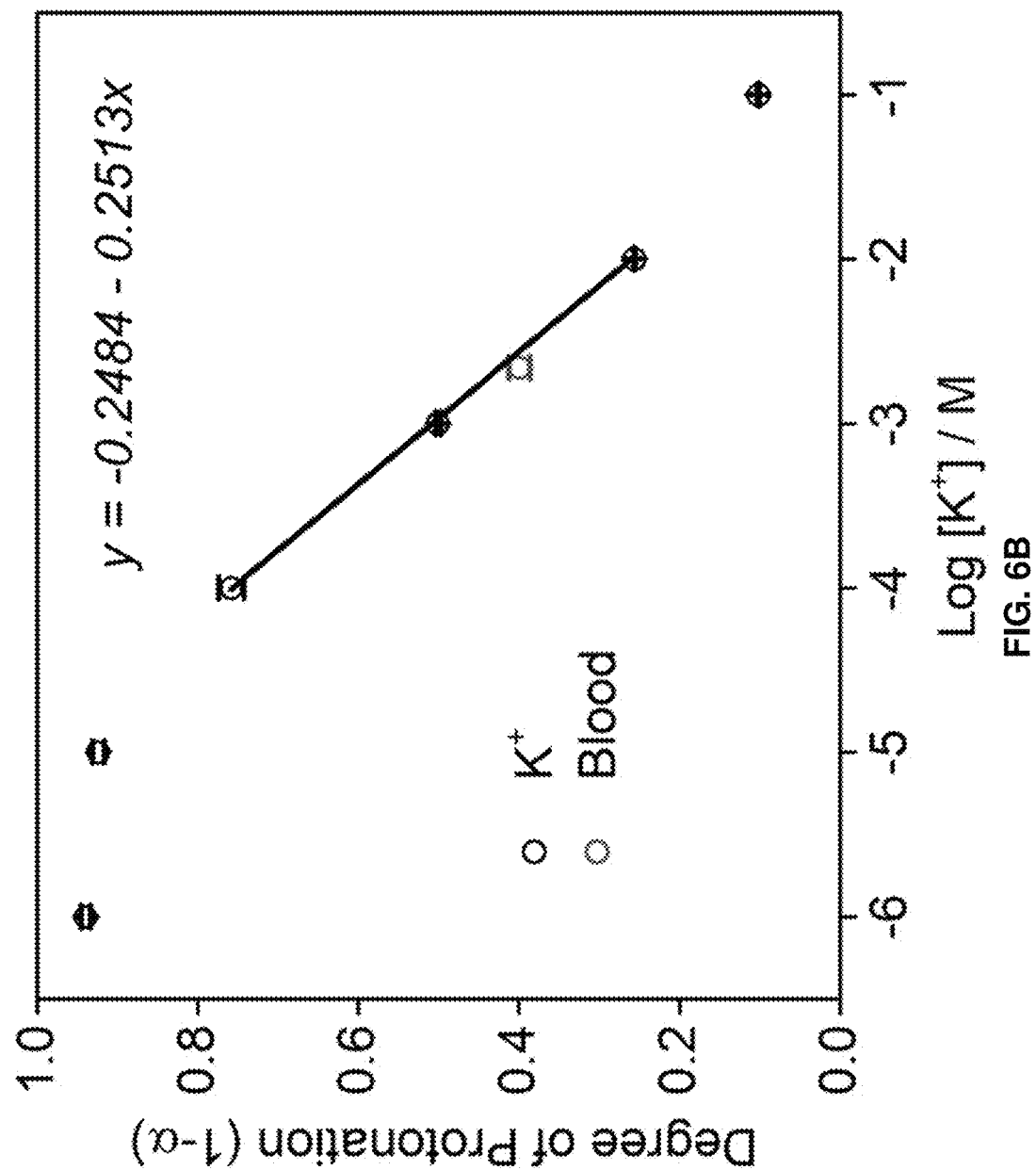
FIG. 6B shows a plot of data for determining the K$^+$ concentration in whole blood based on the mean photon counts in the oil segments shown in FIG. 6A (graph on the left). Sheep blood was diluted with 0.1 M Tris-HCl buffer at pH 7.4 (1:1 dilution). The calculated K$^+$ concentration in the diluted whole blood is 2.6±0.4 mM (n=3), which reasonably matches the concentration of 2.2 mM obtained by a Radiometer blood gas analyzer.

During the development of embodiments of the technology provided herein, experiments were conducted to test the use of the technology for detecting analytes in blood samples. Conventional fluorescent probes are susceptible to optical interference from colored and/or turbid samples such as whole blood. Indeed, although the formation of stable blood droplets has been reported in an image-based characterization of blood coagulation (H. Song, H. W. Li, M. S. Munson, T. G. Van Ha, and R. F. Ismagilov, Anal. Chem. 2006, 78, 4839-4849, incorporated herein by reference), optical chemical analysis of whole blood using droplet microfluidics has not been successful. Interrogation of such complicated samples is also quite challenging for other analytical techniques such as mass spectrometry and Raman spectroscopy. In contrast, embodiments of the biphasic sensing technology described herein uses physically separated liquid phase sensors and samples. Since both the laser illumination and the fluorescence collection are perpendicular to the PDMS chip, the photons generated from the oil segment are detected and a signal recorded without suffering from optical interference from the whole blood droplets (e.g., the aqueous phase sample). As is shown in FIG. 6A, blood droplets do not exhibit any fluorescence under the employed experimental conditions. However, blood droplets produce in a microfluidic $K^+$ device described herein. The $K^+$ concentration in whole blood (FIG. 6B) was determined using the mean photon counts in the oil segments shown in FIG. 6A (graph on the left). The sheep blood was diluted with 0.1 M Tris-HCl buffer at pH 7.4 (1:1 dilution). The calculated $K^+$ concentration in the diluted whole blood is 2.6±0.4 mM (n=3), which reasonably matches the concentration of 2.2 mM as quantified by a Radiometer blood gas analyzer. Furthermore, this sensing platform was used to detect cell lysis. After 5 s of sonication of the blood sample, a reduced fluorescence was indeed observed from the oil segments (FIG. 6A, right panel), indicating the release of $K^+$ from the broken blood cells (intracellular $K^+$ is typically 40-50× greater than plasma $K^+$). Given the distinct capability of droplet microfluidics to encapsulate single cells in tiny droplets, embodiments of the sensing technology provided herein finds use in high-throughput studies of ion channel function on individual whole cells and ion channel-drug interactions via monitoring extracellular ion concentrations.

Sensing Cations, Anions, and Neutral Analytes

During the development of embodiments of the technology described herein, experiments were conducted to test the selectivity and the sensitivity of the ionophore-based ion-selective optodes. In particular, experiments tested the technology using different sensing reagents and different ratios of those reagents to sense a wide variety of analytes.

Figure 7:
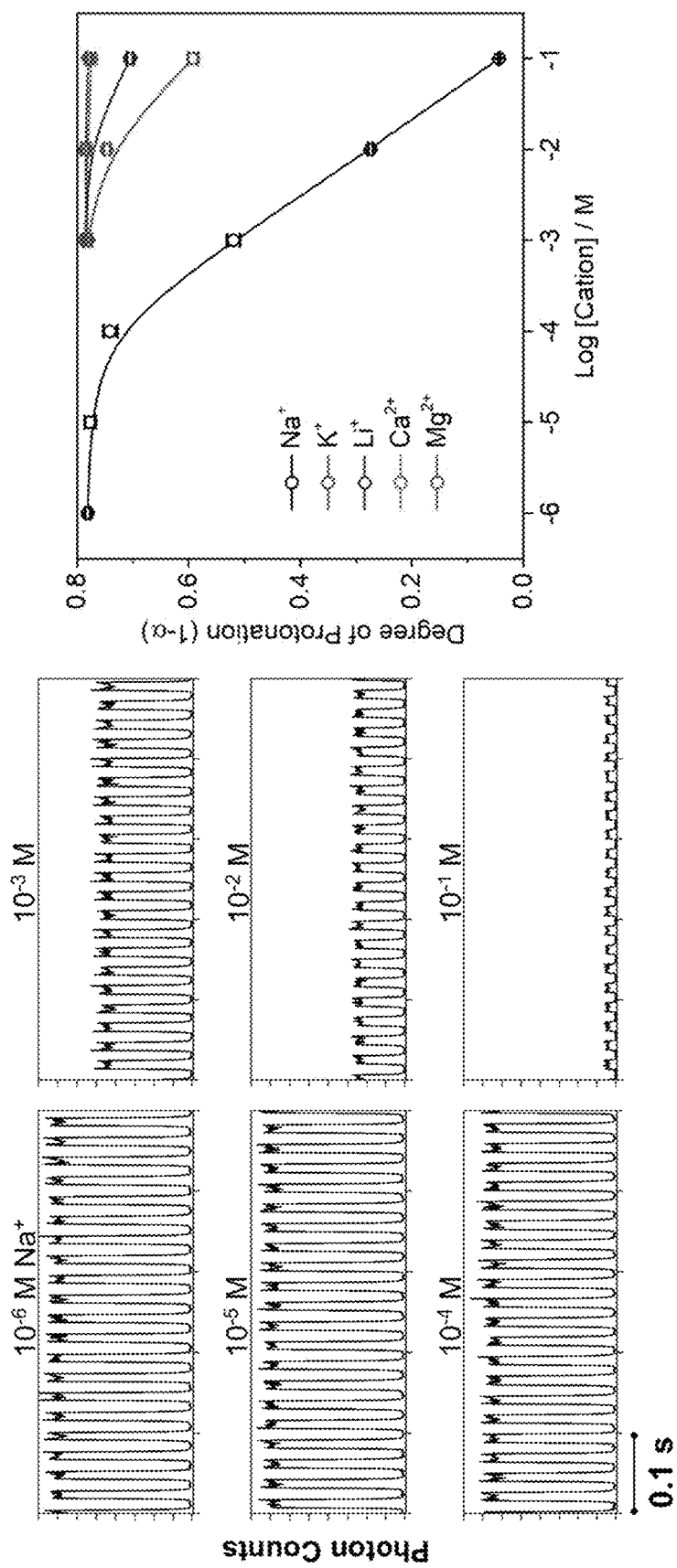
FIG. 7 shows the fluorescence trace of the segmented flow in the presence of different concentrations of NaCl in aqueous Tris-HCl buffer at pH 7.4 (FIG. 7, left) and the corresponding calibration curve (FIG. 7, right) based on mean photon counts of the oil segment in the 0.5-s measurement. Excitation wavelength: 630 nm; emission wavelength: 672.5-737.5 nm.
Figure 7:
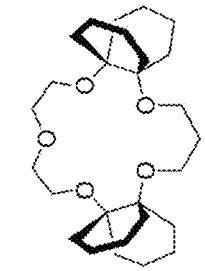
Figure 7:
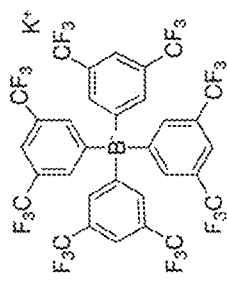
Figure 7:
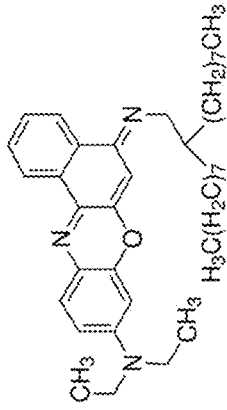
Figure 7:

For example, the use of a $Na^+$ ionophore and a tetraphenylborate type cation exchanger in its potassium salt form renders the oil segments selective toward $Na^+$ (FIG. 7). By using a chloride ionophore, a quaternary ammonium type anion exchanger, and a less basic chromoionophore (chromoionophore I), the technology provides for the fluorescent sensing of $Cl^-$ (FIG. 8).

In addition, embodiments of the technology comprise use of highly selective ionophores for other inorganic cations (e.g., $Ca^{2+}$, $Mg^{2+}$, $Pb^{2+}$, $Zn^{2+}$, $Cd^{2+}$, $Hg^{2+}$, $Ag^+$) and other inorganic anions (e.g., $F^-$, $NO_3^-$, $NO_2^-$, $SO_4^{2-}$, $CO_3^{2-}$). See, e.g., P. Buhlmann; L. D. Chen, in *Supramolecular Chemistry: From Molecules to Nanomaterials* (Eds.: J. W. Steed, P. Gale), John Wiley & Sons, Ltd, New York, 2012, 2539-2579, incorporated herein by reference. Further, embodiments of the technology comprise use of biphasic sensors to detect a wide range of organic ions (e.g., creatinine (T. Guinovart, D. Hernández-Alonso, L. Adriaenssens, P. Blondeau, M. Martinez-Belmonte, F. X. Rius, F. J. Andrade, P. Ballester, Angew. Chem. Int. Ed. 2016, 128, 2435-2440, incorporated herein by reference) and choline derivatives (J. Ampurdanés, G. A. Crespo, A. Maroto, M. A. Sarmentero, P. Ballester, F. X. Rius, Biosens. Bioelectron. 2009, 25, 344-349, incorporated herein by reference)), polyions (e.g., protamine, heparin, and DNA) (M. E. Meyerhoff, B. Fu, E. Bakker, J. H. Yun, V. C. Yang, Anal. Chem. 1996, 68, 168A-175A; S. A. Ferguson, M. E. Meyerhoff, Sensor Actuat B-Chem. 2018, 272, 643-654, incorporated herein by reference), and uncharged organic molecules (e.g., phenols (X. Wang, Z. Ding, Q. Ren, W. Qin, Anal. Chem. 2013, 85, 1945-1950, incorporated herein by reference), boronic acids (X. Wang, D. Yue, E. Lv, L. Wu, W. Qin, Anal. Chem. 2014, 86, 1927-1931, incorporated herein by reference), saccharides (J. Zhai, T. Pan, J. Zhu, Y. Xu, J. Chen, Y. Xie, Y. Qin, Anal. Chem. 2012, 84, 10214-10220, incorporated herein by reference), and $H_2O_2$ (Y. Liu, J. Zhu, Y. Xu, Y. Qin, D. Jiang, ACS Appl. Mater. Interfaces 2015, 7, 11141-11145, incorporated herein by reference)).

During the development of embodiments of the technology described herein, experiments were conducted to test sensing neutral analytes using droplet microfluidics. The limited aqueous solubility of many dyes (e.g., BODIPY) is an obstacle in the application of many BODIPY or aza-BODIPY dyes to previous technologies. Data were collected during experiments using boronic acid-functionalized aza-BODIPY dye in the oil phase to detect hydrogen peroxide, an important reactive oxygen species, in the aqueous droplet based on the oxidative conversion of boronic acids to phenols in the organic oil phase (FIG. 10). Accordingly, the oil-based sensing technology described herein finds use in a broad range of droplet microfluidics analytical capabilities.

Biomolecular Polyion Sensor

During the development of embodiments of the technology provided herein, experiments were conducted to detect a biological molecule using the microfluidic sensing technology described herein. In particular, the technology was used in a chemical sensing approach to detect protamine, an arginine-rich protein with 20 positive charges, as the target analyte. Chromoionophore I and dinonyl naphthalene sulfonic acid (DNNSH) were dissolved in 1,2-dichloroethane as the oil phase. Selective extraction of protamine over singly charged cations into the oil segment was driven by the strong cooperative ion-pairing interaction between one multiply-charged protamine and multiple singly-charged DNNS anions (M. E. Meyerhoff, B. Fu, E. Bakker, J. H. Yun, V. C. Yang, Anal. Chem. 1996, 68, 168A-175A; S. A. Ferguson, M. E. Meyerhoff, Sensor Actuat B-Chem. 2018, 272, 643-654, each of which is incorporated herein by reference). Such extraction competes with protonation of the pH-sensitive chromoionophore and induces decreased fluorescence in the oil segments. In previous sensing technologies, this strong ion association interaction makes conventional polyion-selective sensors irreversible (M. E. Meyerhoff, B. Fu, E. Bakker, J. H. Yun, V. C. Yang, Anal. Chem. 1996, 68, 168A-175A; S. A. Ferguson, M. E. Meyerhoff, Sensor Actuat B-Chem. 2018, 272, 643-654, each of which is incorporated herein by reference), which limits previous technologies compared to ion-selective optodes for small ions.

Figures 9A, 9B:
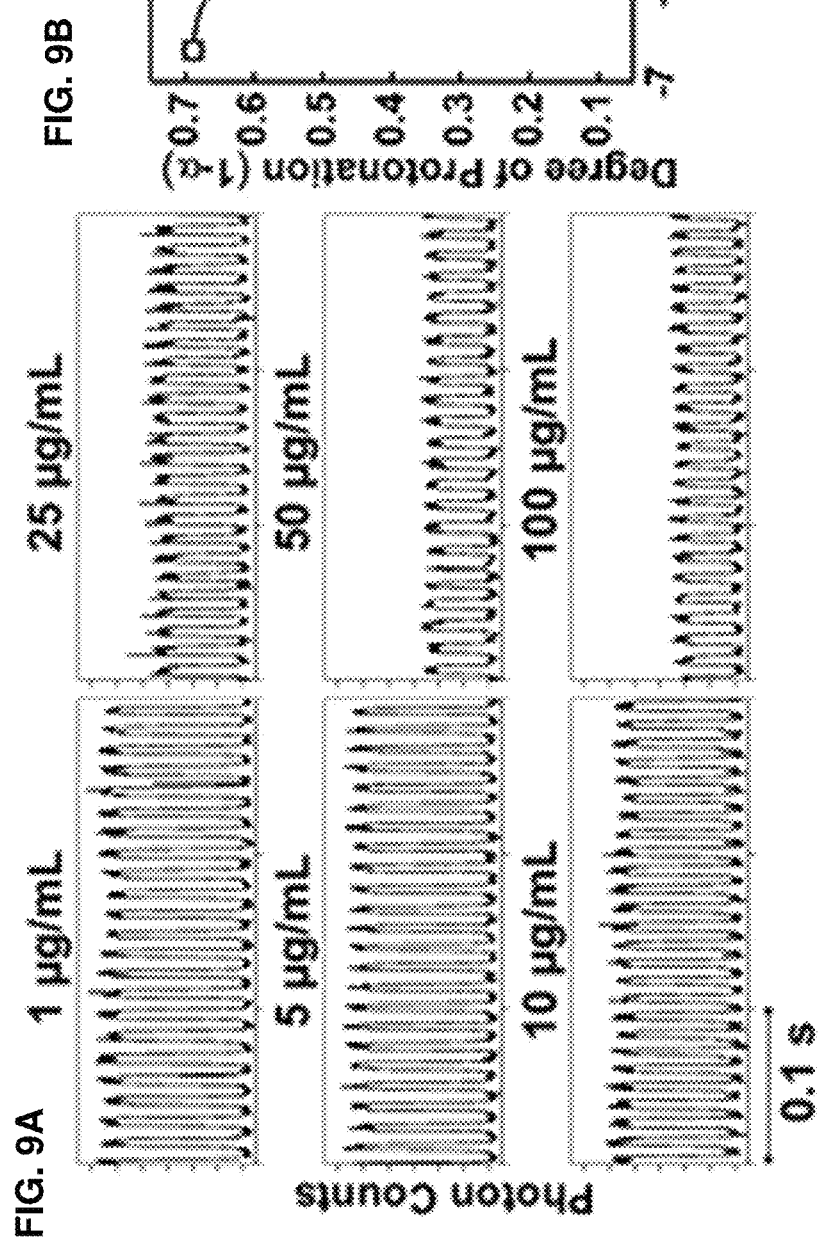
FIG. 9A shows fluorescence traces of the segmented flow in the presence of different concentrations of protamine in 50 mM Tris-HCl buffer at pH 7.4.
FIG. 9B shows the calibration curve for protamine and small cations. The data point at approximately −5 log cation and approximately 0.7 decree of protonation is the data collected for the response toward a 50 µg/mL protamine solution containing 12 U/mL heparin.

In the present technology, every oil segment is used for one measurement and fresh oil segments (e.g., as pseudo sensors) are generated continuously. Therefore, the technology does not require reversibility of the biphasic sensing chemistry, thus providing another distinct advantage of the droplet microfluidic-based sensing technology provided herein. Furthermore, if the protamine is neutralized by polyanions such as heparin, the fluorescence response is minimized and/or eliminated because the complexed polycations do not form ion-pairs with DNNS anions (FIG. 9, data point at approximately −5 log cation and approximately 0.7 decree of protonation). Accordingly, experiments are conducted to monitor blood heparin levels continuously using droplet microfluidics. Such a technology and assay find use during extracorporeal procedures (e.g., cardiopulmonary bypass surgery, etc.) to determine the concentration of anticoagulant (e.g., heparin) in blood during such procedures. Moreover, this same polyion sensing method finds use in applications such as enzyme assays (M. E. Meyerhoff, B. Fu, E. Bakker, J. H. Yun, V. C. Yang, Anal. Chem. 1996, 68, 168A-175A; S. A. Ferguson, M. E. Meyerhoff, Sensor Actuat B-Chem. 2018, 272, 643-654; X. Wang, Q. Wang, W. Qin, Biosens. Bioelectron. 2012, 38, 145-150, incorporated herein by reference), enzyme inhibitor/activator tests (M. E. Meyerhoff, B. Fu, E. Bakker, J. H. Yun, V. C. Yang, Anal. Chem. 1996, 68, 168A-175A; S. A. Ferguson, M. E. Meyerhoff, Sensor Actuat B-Chem. 2018, 272, 643-654; X. Wang, Q. Wang, W. Qin, Biosens. Bioelectron. 2012, 38, 145-150, incorporated herein by reference), aptasensing (J. Ding, Y. Chen, X. Wang, W. Qin, Anal. Chem. 2012, 84, 2055-2061; J. Ding, Y. Gu, F. Li, H. X. Zhang, W. Qin, Anal. Chem. 2015, 87, 6465-6469, each of which is incorporated herein by reference), and nonseparation immunoassays (S. Dai, M. E. Meyerhoff, Electroanal. 2001, 13, 276-283, incorporated herein by reference) that are integrated into the droplet microfluidics technology provided herein.

In summary, the oil phase in droplet microfluidics provides a promising technology for sensing of ionic, polyionic, and non-ionic species in aqueous sample droplets. This sensing scheme is fast, reagent-economic, and compatible with a complicated sample matrix (e.g., biological samples such as, e.g., whole blood).

All publications and patents are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A microfluidic analyte sensing device comprising:
   an oil input line and a sample input line that meet at a T-junction or flow-focusing junction;
   a sensing oil flowing through the oil input line, wherein the sensing oil comprises a dissolved signaling molecule; and the signaling molecule is specific for an analyte and produces a detectable optical signal in response to contacting the analyte;
   a biological sample provided in the sample input line, wherein the sensing oil contacts the biological sample at the T-junction or flow-focusing junction to provide sensing oil segments and sample droplets that flow through a detection channel;
   a light source providing light perpendicular to the detection channel and configured to illuminate sensing oil segments in the detection channel without simultaneously illuminating sample droplets; and
   a detection means oriented to monitor a signal produced by the sensing oil segments in the detection channel upon being illuminated by the light source.

2. The microfluidic analyte sensing device of claim 1 wherein the sensing oil further comprises a dissolved recognition molecule that is specific for the analyte.

3. The microfluidic analyte sensing device of claim 1 wherein the sensing oil further comprises a dissolved ion exchanger molecule.

4. The microfluidic analyte sensing device of claim 2 wherein the sensing oil further comprises a dissolved ion exchanger molecule.

5. The microfluidic analyte sensing device of claim 1 wherein the sensing oil comprises an oil that is dioctyl sebacate, mineral oil, hexadecane, 4-3-phenylpropylpyridine, dichloroethane, or a fluorous oil.

6. The microfluidic analyte sensing device of claim 1 wherein the signaling molecule comprises a chromoionophore.

7. The microfluidic analyte sensing device of claim 2 wherein the recognition molecule comprises an ionophore.

8. The microfluidic analyte sensing device of claim 1 wherein the sensing oil further comprises a dissolved ion exchanger molecule.

9. The microfluidic analyte sensing device of claim 1 wherein the biological sample is a biofluid.

10. The microfluidic analyte sensing device of claim 1 wherein the biological sample is blood, serum, plasma, urine, tear, sweat, or saliva.

11. The microfluidic analyte sensing device of claim 1 wherein said microfluidic analyte sensing device produces droplets having a volume of 0.05 to 50 nl.

12. The microfluidic analyte sensing device of claim 1 wherein said microfluidic analyte sensing device produces sensing oil segments having a volume of 0.05 to 50 nl.

13. The microfluidic analyte sensing device of claim 1 wherein said microfluidic analyte sensing device produces sensing oil segments at a frequency of 10 to 1000 Hz.

14. The microfluidic analyte sensing device of claim 1 wherein said microfluidic analyte sensing device produces droplets at a frequency of 10 to 1000 Hz.

15. The microfluidic analyte sensing device of claim 1 wherein said microfluidic analyte sensing device is capable of detecting an analyte having a concentration of 1 to $10^{-12}$ M and/or 0.01 to 500 µg/ml in a sample or droplet.

16. A method for detecting and/or quantifying an analyte, the method comprising:
   a) providing a microfluidic analyte sensing device comprising a sensing oil, wherein said sensing oil comprises a dissolved signaling molecule that is specific for an analyte and that produces a detectable optical signal in response to contacting the analyte;
   b) forming droplets from a biological sample and forming sensing oil segments from said sensing oil, wherein said sensing oil segments flow through a detection channel;
   c) illuminating the sensing oil segments using a light source providing light perpendicular to the detection channel, wherein the light source does not simultaneously illuminate the biological sample or droplets;
   d) detecting a signal produced by sensing oil segments upon being illuminated by the light source; and
   e) detecting and/or quantifying an analyte in one or more of said droplets using the signal produced by the sensing oil segments.

17. The method of claim 16 further comprising producing said sensing oil by dissolving a signaling molecule in an oil to produce said sensing oil; and/or
   dissolving a signaling molecule and a recognition molecule in an oil to produce said sensing oil.

18. The method of claim 17 further comprising dissolving an ion exchanger molecule in said oil to produce said sensing oil.

* * * * *